(12) United States Patent
Shintani et al.

(10) Patent No.: US 9,215,375 B2
(45) Date of Patent: Dec. 15, 2015

(54) PHOTOGRAPHING APPARATUS, IMAGE DISPLAY APPARATUS, AND DISPLAY CONTROL METHOD OF IMAGE DISPLAY APPARATUS

(71) Applicants: Olympus Corporation, Shibuya-ku, Tokyo (JP); Olympus Imaging Corp., Shibuya-ku, Tokyo (JP)

(72) Inventors: Koichi Shintani, Hachioji (JP); Shinsuke Homma, Hino (JP); Takayuki Matsuhashi, Hino (JP); Takehiko Tabata, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/204,426

(22) Filed: Mar. 11, 2014

(65) Prior Publication Data

US 2014/0267803 A1 Sep. 18, 2014

(30) Foreign Application Priority Data

Mar. 15, 2013 (JP) .................................. 2013-054252

(51) Int. Cl.
*H04N 5/232* (2006.01)
(52) U.S. Cl.
CPC ....... *H04N 5/23293* (2013.01); *H04N 5/23219* (2013.01); *H04N 5/23296* (2013.01)
(58) Field of Classification Search
CPC .......... H04N 5/23293; H04N 5/23296; H04N 5/23219
USPC .................................................. 348/333.03
See application file for complete search history.

(56) References Cited

U.S. PATENT DOCUMENTS

| 5,794,078 | A | * | 8/1998 | Okazaki ........................ 396/50 |
| 2008/0002028 | A1 | * | 1/2008 | Miyata ......................... 348/169 |
| 2010/0053419 | A1 | * | 3/2010 | Fukui ........................... 348/352 |
| 2012/0050587 | A1 | * | 3/2012 | Yamamoto .................... 348/262 |
| 2012/0274780 | A1 | * | 11/2012 | Yamamoto ............... 348/333.12 |
| 2012/0300051 | A1 | * | 11/2012 | Daigo et al. .................... 348/77 |

FOREIGN PATENT DOCUMENTS

JP 2001-069496 3/2001

\* cited by examiner

*Primary Examiner* — Gevell Selby
(74) *Attorney, Agent, or Firm* — John C. Pokotylo; Straub & Pokotylo

(57) ABSTRACT

A photographing apparatus includes an image pickup section configured by a photographing optical system for aiming at a target, and an image pickup device, a display section for receiving an image signal outputted from the image pickup section, and for displaying an image, a display control section for controlling display on the display section, a main object setting section for setting the target based on the image signal outputted from the image pickup section, and a zoom control section for performing zooming with respect to the target, wherein auxiliary displaying for clearly indicating a position of the target set by the main object setting section is performed, being superimposed on the image displayed on the display section.

14 Claims, 16 Drawing Sheets

PHOTOGRAPHING APPARATUS, IMAGE DISPLAY APPARATUS, AND DISPLAY CONTROL METHOD OF IMAGE DISPLAY APPARATUS

CROSS REFERENCE TO RELATED APPLICATION

This application claims the benefit of Japanese Application No. 2013-054252 filed in Japan on Mar. 15, 2013, the contents of which are incorporated herein by this reference.

BACKGROUND OF THE INVENTION

1. Field of the Invention

This invention relates to a photographing apparatus having a high power zoom function, an image display apparatus, and a display control method of the image display apparatus, the photographing apparatus having a configuration capable of reliably capturing a desired photographing target (object) in the field of view of a viewfinder.

2. Description of the Related Art

Conventionally, an image display device that is capable of sequentially converting optical images formed by a photographing optical system into image signals by a photoelectric conversion device or the like and of recording the image signals thus obtained in a recording medium as pieces of image data of a predetermined format, and that reproduces/displays the image data recorded in the recording medium as an image, such as a photographing apparatus, such as a digital camera or a camcorder, configured by including, for example, a liquid crystal display (LCD) is put to practical use and is widely used.

Also, these days, as a photographing optical system applied to this type of photographing apparatus, one having a high power zoom lens whose optical zoom factor is 20× or higher, for example, is being put to practical use. Moreover, in addition, one having a so-called electronic zoom function which enables generation of a further enlarged image by applying predetermined image processing on picked-up image data is widespread. Some photographing apparatuses having this electronic zoom function have an extremely high power zoom function with the zoom factor (optical zoom factor×electronic zoom factor) for the minimum focal length being 80×, for example.

When photographing using this type of photographing apparatus having a high power zoom function, if drastic zooming is performed in a state where setting is on the short focus side, a main object which is intended to be photographed may move out of the field of view of the viewfinder or an image display range of a display device used as the viewfinder (a rear display panel or an EVF (electric view finder)) and the main object may be lost. In this manner, there is an issue that re-capturing of the main object lost from the field of view of the viewfinder into the field of view of the viewfinder (into the image display range) is more difficult as the zoom range is set more to the long focus side (high zoom factor).

With respect to a conventional camera, one which is configured to allow alignment of the direction of the camera with the target position by a simple operation, by a user, of specifying the photographing position or the photographing direction of the camera, such as the surveillance camera disclosed in Japanese Patent Application Laid-Open Publication No. 2001-69496, for example, is proposed and put to practical use.

SUMMARY OF THE INVENTION

A photographing apparatus of the present invention includes an image pickup section configured by a photographing optical system for aiming at a target, and an image pickup device, a display section for receiving an image signal outputted from the image pickup section, and for displaying an image, a display control section for controlling display on the display section, a main object setting section for setting the target based on the image signal outputted from the image pickup section, and a zoom control section for performing zooming with respect to the target, wherein auxiliary displaying for clearly indicating a position of the target set by the main object setting section is performed, being superimposed on the image displayed on the display section.

An image display apparatus of the present invention is an image display apparatus capable of changing an observation angle of view and acquiring an image, the image display apparatus including an ideal image creation section for creating a plurality of pieces of ideal image data that are created by predicting ideal angle-of-view changed images at a time of narrowing the angle of view, an image comparison section for sequentially comparing an ideal image and images acquired by an angle-of-view change operation, and a display control section for displaying, according to a result of identification based on a result of an image comparison process, by the image comparison section, of a difference region between the ideal image and an acquired image, the difference region as auxiliary displaying in a manner allowing viewing.

A display control method of the present invention is a display control method of an image display apparatus capable of changing an observation angle of view and acquiring an image, the display control method including creating a plurality of pieces of ideal image data that are created by predicting ideal angle-of-view changed images at a time of narrowing the angle of view, sequentially comparing an ideal image and images acquired by an angle-of-view change operation, and identifying a difference region between the ideal image and the acquired image based on a result of an image comparison process, and displaying the difference region in a manner allowing viewing.

The advantages of this invention will be further clarified by the following detailed description.

DETAILED DESCRIPTION OF THE PREFERRED EMBODIMENTS

Figure 1:
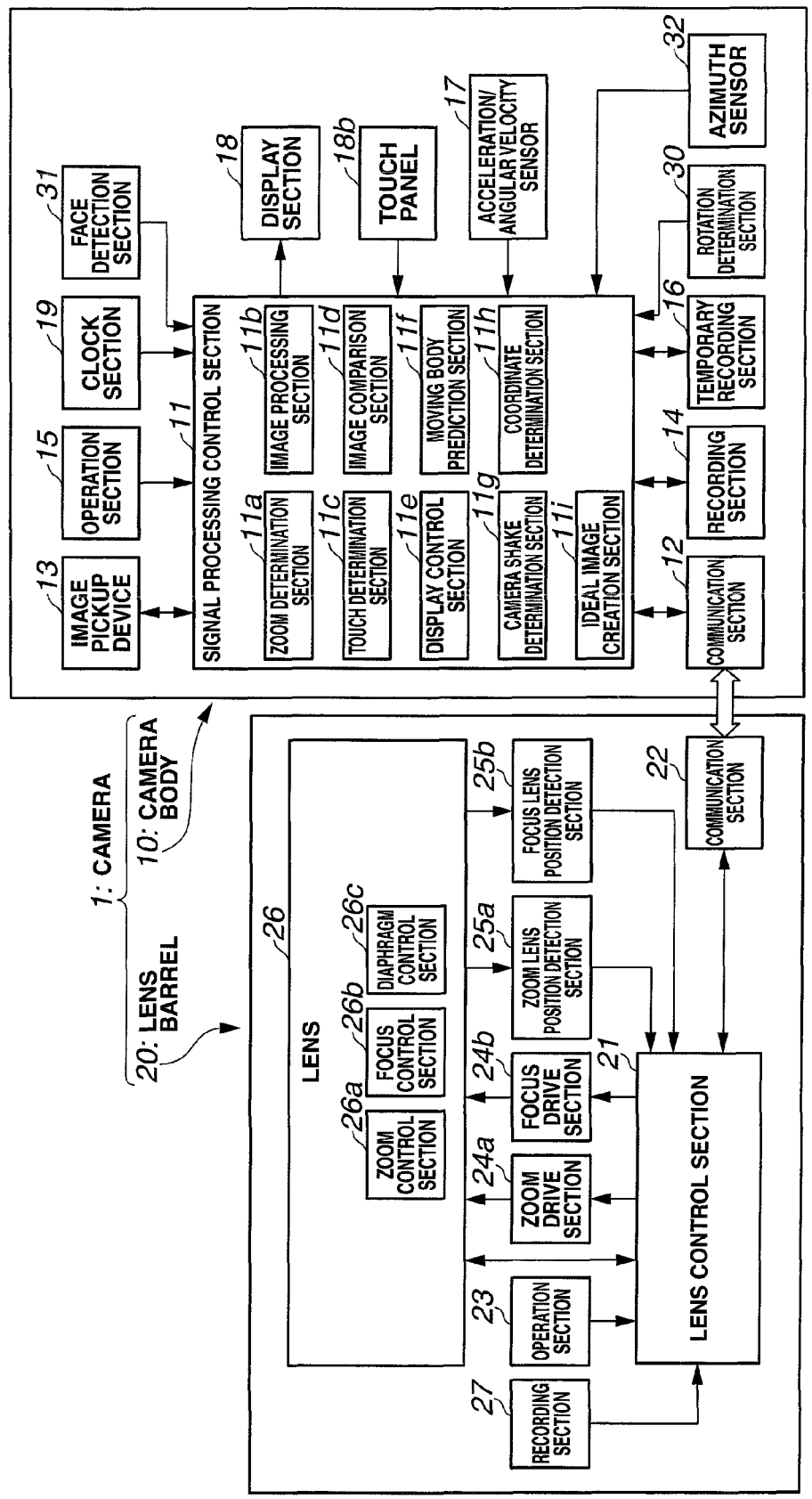
FIG. 1 is a block configuration diagram schematically showing main internal components of a photographing apparatus (camera) of a first embodiment of the present invention.

Hereinafter, preferred embodiments of the present invention will be described with reference to the drawings. Note that in each of the drawings used in the following description, the scale of display of each structural component may be different such that each structural component is large enough to be recognized in the drawing. Accordingly, the present invention is not restricted to the modes shown in the drawings with respect to the number of structural components, the shapes of the structural components, the proportion of the sizes of the structural components, and the relative positional relationship of respective structural components.

First Embodiment

A first embodiment of the present invention illustrates a photographing apparatus (hereinafter referred to simply as "camera") which includes a photographing optical system configuring a high power zoom lens, and which is configured to be capable of photoelectrically converting, by using a solid image pickup device, an optical image formed by an optical lens or the like of the photographing optical system, of recording an image signal thus obtained in a recording medium as digital data representing a still image or a movie, and also, of reproducing/displaying the still image or the movie based on the digital image data recorded in the recording medium on a display device. Note that this type of photographing apparatus is provided with a display device for displaying an image as described above, and thus, also includes a function of an image display apparatus.

First, a schematic configuration of a camera which is the photographing apparatus of the first embodiment of the present invention will be described below. FIG. 1 is a block configuration diagram schematically showing main internal components of the photographing apparatus (camera) of the first embodiment of the present invention.

As shown in FIG. 1, a camera 1, which is the photographing apparatus of the present embodiment, is configured by a camera body 10, and a lens barrel 20. The camera 1 is a so-called interchangeable lens camera according to which the lens barrel 20 may be freely attached/detached with respect to the camera body 10. Note that the present embodiment gives a description citing the interchangeable lens camera as an example, but a camera to which the present invention may be applied is not limited to such mode, and application to a camera which is configured by integrating the camera body 10 and the lens barrel 20, for example, is similarly possible.

The camera body 10 is configured by including a signal processing control section 11, a body-side communication section 12, an image pickup device 13, a recording section 14, an operation section 15, a temporary recording section 16, an acceleration/angular velocity sensor 17, a display section 18, a touch panel 18b, a clock section 19, a rotation determination section 30, a face detection section 31, an azimuth sensor 32, and the like.

The signal processing control section 11 has a function as a control section for controlling the operation of the camera 1 in an overall manner, and is a circuit section having a function of a signal processing section for processing control signals of various structural units and for performing various types of signal processing and the like on an image signal (image data) acquired by the image pickup device 13.

Various circuit sections are provided inside the signal processing control section 11, such as a zoom determination section 11a, an image processing section 11b, a touch determination section 11c, an image comparison section 11d, a display control section 11e, a moving object (or body) prediction section 11f, a camera shake determination section 11g, a coordinate determination section 11h and an ideal image creation section 11i.

Of the above, the zoom determination section 11a is a circuit section for performing detection and determination regarding whether zooming is manual zooming based on a manual zoom operation (zooming by manually operating an operation member provided to the lens barrel and partially displacing the zoom lens) or electric zooming performed by operation of a zoom lever or the like (not shown) included in the operation section 15 on the side of the camera body 10 or a zoom switch or the like (not shown; details will be given below) included in an operation section 23 on the side of the lens barrel 20. The determination process is performed upon reception of an instruction signal generated by operation of a zoom ring, the zoom lever or the zoom switch, for example. Furthermore, the zoom determination section 11a also performs determination regarding whether a zoom direction, that is, a zoom operation performed, indicates zooming from a short focus (wide angle) side to a long focus (telephoto) side or the reverse direction.

The image processing section 11b is a signal processing circuit section for applying various types of image processing based on image data acquired by the image pickup device 13.

The touch determination section 11c is a signal processing circuit for receiving an instruction input signal from the touch panel 18b, and for determining the instruction content. Various types of control inside the signal processing control section 11 are performed based on the determination result of the touch determination section 11c.

The image comparison section 11d is a circuit section for performing an image comparison process of comparing a plurality of pieces of image data sequentially acquired by the image pickup device 13, that is, a plurality of pieces of image data forming a live view image, and a plurality of ideal images according to the zoom amounts obtained by predicting a change in the angle of view at the time of ideal zooming.

The display control section 11e is a control circuit section for driving and controlling the display section 18. The display control section 11e performs control of receiving image data generated and acquired by an image pickup section including the image pickup device 13, a lens 26 (described below), and the like, and of displaying the image data on a display panel of the display section 18 as an image.

Here, the image pickup section mentioned above is a unit configured by including the lens 26 (described below) or the like, which is a photographing optical system that passes light from a target (object) which is a photographing target and forms an optical image of the object, and the image pickup device 13 that receives the object image (optical image) formed by the lens 26 and performs a photoelectric conversion process.

The moving object (or body) prediction section 11f is a circuit section for calculating a motion vector of an object between frames based on a plurality of pieces of image data sequentially acquired by the image pickup device 13 (image data acquired at a predetermined frame rate) and detecting a moving object, and for performing an image movement amount calculation process or the like of predicting and computing the movement direction and the movement speed of the moving object in the image. The moving object detected by this moving object prediction section 11f may be set as the main object. In this case, the moving object prediction section 11f also functions as a main object setting section.

The camera shake determination section 11g is an attitude determination section configured by a circuit section for determining an attitude state or the like of the camera 1 based on a plurality of pieces of image data sequentially acquired by the image pickup device 13 or an output of the acceleration/angular velocity sensor 17, the azimuth sensor 32 or the like, and for determining camera shake or the like of the camera 1 by computation. Moreover, the camera shake determination section 11g also functions as a circuit section for determining the amount of shift, the shifting direction or the like of the camera 1 based on the result of image comparison process by the image comparison section 11d.

The coordinate determination section 11h is a circuit section for identifying the position of a specific object image in an image based on image data acquired by the image pickup device 13, and for determining its coordinates by computation.

The ideal image creation section 11i is an image signal processing circuit section for predicting the state of a change in the angle of view (change in a photographing region) at the time of execution of ideal zooming, with respect to a main object (see reference numeral 101 in FIG. 3 and the like) which is a photographing target set in a state where the zoom factor of the lens 26 is set to a low value (small value), and for creating a plurality of pieces of image data according to the zoom amounts at the time of zooming. That the zoom factor is set to a low value means that the focal length of the zoom lens is set to a short value (on the short focus side) (or that the angle of view of the zoom lens is set to be wide). That the zoom factor is set to a high value means that the focal length of the zoom lens is set to be long (on the long focus side) (or that the angle of view of the zoom lens is set to be narrow).

Here, a main object is an object which is a main subject that a photographer wants to photograph. Normally, a photographer holds the camera 1 toward a main object, and performs zooming, a focus adjustment operation or the like with the main object in the field of view of the viewfinder. In this case, zooming is usually performed with the main object positioned substantially at the center of the field of view of the viewfinder. Also, the focus adjustment operation is performed with respect to a main portion of the main object, such as the position of the eyes in the case of a person's face. Accordingly, for example, in the case the focus adjustment operation is performed on an object positioned substantially at the center of the field of view of the viewfinder, this object may be set as the main object. In this case, a region on which the focus adjustment operation has been performed may be identified based on the position of an AF selection area for performing focus adjustment.

Furthermore, ideal zooming is zooming that is performed in such a way that a main object (101) is always positioned at substantially the center of the field of view of the viewfinder. Also, a plurality of images that are expected to be acquired when such ideal zooming is performed are referred to as ideal images. That is, the ideal images are images according to which the main object (101) is always positioned at substantially the center of the field of view of the viewfinder, and are images corresponding to arbitrary timings during continuous change in the angle of view due to zooming (see FIG. 3 described below). As described above, this ideal image may be predicted by computation based on a change in the angle of view by zooming, and may be created by applying a trimming process or the like based on image data which may be acquired in the case the zoom factor is set to a minimum value (the zoom lens is set to a wide angle end), for example. Then, the ideal image creation section 11i creates an ideal image which may be acquired in the case the zoom factor is set to a maximum value (the zoom lens is set to a telephoto end), for example, among the ideal images described above, as a reference image. As will be described below, this reference image is temporarily recorded in the temporary recording section 16 (see the process of step S104 in FIG. 6 described below).

As the image pickup device 13, for example, a photoelectric conversion device, which is a solid image pickup device such as an MOS image sensor using an MOS (metal oxide semiconductor) or a CCD image sensor using a circuit element such as a CCD (charge coupled device), is used. An analog image signal generated by the image pickup device 13 is outputted to the image processing section 11b of the signal processing control section 11, and various types of image signal processing are performed.

The recording section 14 is a structural section configured by including a signal processing circuit section for receiving an image signal outputted from the image pickup device 13 and processed by the image processing section 11b and for converting the signal into a predetermined format, a recording medium for recording image data generated by the signal processing circuit section, a control section for driving and controlling the recording medium, and the like. The conversion process of an image signal that is performed at this time is a process of conversion into image data of a recording format by a signal compression process or the like, or signal processing of restoring an image signal by reading image data recorded in the recording medium and performing an extension process or the like thereon. Note that this type of compression/extension process is not limited to be performed by the signal processing circuit section included in the recording section 14, and for example, a similar signal processing circuit section may be provided in the signal processing control section 11 and the process may be performed by the same.

The temporary recording section 16 is a circuit section for temporarily recording image data acquired by the image pickup device 13 and the like, and a semiconductor memory device such as an EEPROM (electrically erasable programmable read-only memory) or a RAM (random access memory) is used.

The operation section 15 includes various types of operation members, such as an operation member of a normal push button type, a slide type, or a dial type, provided to the package portion of the camera body 10 of the camera 1, and refers to a structural section for operation including various general operation members such as a shutter release button (not particularly shown).

Note that the camera 1 of the present embodiment includes the touch panel 18b as an operation member for operation different from the operation section 15. This touch panel 18b is arranged on the display surface of the display section 18, and is an operation member configured in such a way that various operation instruction signals are generated when a photographer performs a touch operation, a slide operation and the like on a predetermined region corresponding to an image being displayed on the display panel. An instruction input signal from the touch panel 18b is sent to the touch determination section 11c of the signal processing control section 11, and the operation input is determined.

The display section 18 is a structural section for performing image display under the control of the display control section 11e based on image data or the like outputted from the image pickup device 13 or image data on which the extension process has been performed by the recording section 14. As the display section 18, a display panel such as a liquid crystal display (LCD), a plasma display (PDP), or an organic electroluminescence display (OEL) is used. This display section 18 has a function of reproducing/displaying an image based on image data which has been photographed and recorded, and also functions as a viewfinder for observing and checking a photographed range at the time of an photographing operation by sequentially and continuously receiving image data outputted from the image pickup device 13 and keeping displaying the image. Note that as the display section, a small panel to be used as an electric viewfinder (EVF) may also be provided in addition to the display panel provided to the rear side of the apparatus. In the case of a normal camera, the range that can be observed using the viewfinder is referred to as the field of view of the viewfinder, but as described above, the camera 1 of the present embodiment uses, as the viewfinder, a display device that displays an image based on image data outputted from the image pickup device 13. Thus, the observation image that may be observed by the display section 18, which is the viewfinder, of the camera 1 of the present embodiment is a display image based on the image data. Accordingly, in the following description, the image displayed on the display section 18 as the viewfinder will be referred to as a viewfinder image.

The clock section 19 is an internal clock of a computer called a real-time clock (RTC). The clock section 19 is used at the time of attaching date information of a data file, or of time keeping or time control during control process, for example.

The acceleration/angular velocity sensor 17 detects the attitude of the camera 1 with respect to the horizontal position or the vertical position, that is, the state of inclination (for example, the angle of elevation) with respect to the vertical direction of the optical axis of the photographing optical system. The attitude state with respect to the way the camera 1 is held, that is, the way of holding at the vertical position or the horizontal position, is detected (in other words, the up-down direction of an image is determined, and the amount of rotation of the camera 1 around the axis orthogonal to the optical axis is measured). The acceleration/angular velocity sensor 17 is a detection signal processing circuit section which includes an accelerometer and an angular velocity sensor (gyroscope), and which is for detecting and processing outputs of these sensors.

The azimuth sensor 32 is a detection signal processing circuit section for detecting the azimuth of the optical axis of the photographing optical system of the camera 1. As the azimuth sensor 32, a magnetic field sensor or an electronic compass is used, for example.

The body-side communication section 12 is a signal processing circuit section for communication on the side of the camera body 10 for exchanging control signals, information signals and the like between the camera body 10 and the lens barrel 20 by being electrically connected with a lens-side communication section 22 described below.

The rotation determination section 30 is a determination circuit section for determining whether the camera 1 is rotated around the optical axis, and in the case the camera 1 is rotated, for determining the rotation direction and the like, based on attitude change information regarding the camera 1 detected by the acceleration/angular velocity sensor 17 and the like. The image processing section 11b receives the determination result of the rotation determination section 30, and then, performs a display image rotation process for appropriately displaying an image that is being displayed on the display panel of the display section 18 with respect to the top-bottom, left-right relationship.

The face detection section 31 is an image signal processing circuit section as an object detection section for detecting whether an image corresponding to an object such as the face of a person, or a specific animal or plant (for example, a dog, a cat, a bird, or a flower) is present in an image that is displayed based on the image data which has been acquired by the image pickup device 13 and which has been outputted after image processing by the image processing section 11b. The face detection section 31 may perform color detection or pattern detection, for example, in addition to detecting a face image. Then, with respect to the object detected by the face detection section 31, the signal processing control section 11 performs control of maintaining focus on a followed object at all times by automatically following a moving object in images while performing moving object prediction control in cooperation with the moving object prediction section 11f.

The lens barrel 20 is configured mainly by a lens control section 21, the lens-side communication section 22, the lens-side operation section 23, a zoom drive section 24a, a focus drive section 24b, a zoom lens position detection section 25a, a focus lens position detection section 25b, the lens 26, which is a photographing optical system, a lens-side recording section 27, and the like.

The lens control section 21 is a control section for controlling the operation of each structural unit on the side of the lens barrel 20 under the control of the signal processing control section 11 on the side of the camera body 10.

The operation section 23 collectively refers to operation members such as a focus ring for performing a switching operation at the lens side, such as switching between a normal photographing mode and a close-up photographing mode, operations such as an autofocus (AF) operation and a manual focus (MF) operation, and a focus adjustment operation, a zoom ring for performing a zoom operation, and an electrical zoom switch.

The zoom drive section 24a is a drive unit including a drive motor for driving a zoom optical system, of the lens 26, related to a zoom operation (optical zoom control), a drive mechanism for transferring the driving force of the motor, and the like. Also, the focus drive section 24b is a drive unit including a drive motor for driving a focusing optical system, of the lens 26, related to a focus operation, a drive mechanism for transferring the driving force of the motor, and the like.

The zoom lens position detection section 25a is a position detection circuit for detecting the position of the zoom optical system on the optical axis (the focal length of the zoom lens is detected based on the output of this position detection circuit). Moreover, the focus lens position detection section 25b is a position detection circuit for detecting the position of the focusing optical system on the optical axis.

The lens-side recording section 27 is a circuit section for recording including a recording medium in which various pieces of information regarding the lens barrel 20 and the like are recorded in advance. The various pieces of information recorded in the recording section 27 are used as appropriate and as necessary by being transferred to the side of the camera body 10 from the lens control section 21 via each of the communication sections 22 and 12. As this lens-side recording section 27, a non-volatile semiconductor memory device such as an EEPROM, a ROM (read only memory) or a flash memory is used.

The lens 26 includes, in addition to a photographing optical system, configured by a plurality of optical lenses or the like, for forming an optical image of an object, a plurality of lens barrel members for holding respective optical lenses of the photographing optical system, lens barrels for separately moving each of the plurality of lens barrel members back and forth in the optical axis direction, and the like, a zoom control section 26a for controlling the zoom optical system which is a part of the photographing optical system, a focus control section 26b for controlling the focusing optical system which is a part of the photographing optical system, a diaphragm mechanism for adjusting the amount of a luminous flux passing through the photographing optical system, a diaphragm control section 26c for driving the diaphragm mechanism, and the like. Note that, as described above, the image pickup section is configured by the lens 26 and the image pickup device 13 of the camera body 10.

Note that, in the present embodiment, a so-called high power optical zoom lens capable of realizing an optical zoom factor of about 20× to 50×, for example, is used as the photographing optical system included in the lens 26. Also, the lens 26, which is the photographing optical system in the lens barrel 20 of the present embodiment, includes a so-called electric zoom mechanism capable of performing zooming by being moved back and forth by a drive motor or the like included in the zoom drive section 24a. Since the concrete configuration of the mechanism is substantially the same as that of an electric high-power zoom lens, having a general configuration, used in a conventional camera, detailed description and illustration of the concrete configuration thereof are omitted.

Furthermore, the lens barrel 20 described above is not limited to the mode of including the electric zoom mechanism, and it may alternatively include a manual zoom mechanism allowing a photographer to perform zooming by freely rotating a zoom ring of a lens operation section provided on the outer peripheral surface of the lens barrel, for example.

The lens-side communication section 22 is a signal processing circuit section for communication on the side of the lens barrel 20 for exchanging control signals, information signals and the like between the lens barrel 20 and the camera body 10 by being electrically connected with the body-side communication section 12.

Note that the camera body 10 and the lens barrel 20 are configured by including other various structural units in addition to the structural sections described above, but these various structural units are structures not directly related to the present invention, and detailed description and illustration of the units are omitted assuming that the units have the same structures as those of a general, conventional camera.

For example, a shutter mechanism for opening/closing the optical path of the photographing optical system, and adjusting the amount of luminous flux passing through the photographing optical system at the time of photographing is not illustrated nor described, but the camera 1 of the present embodiment also includes a normal shutter mechanism the same as that of a conventional camera. This shutter mechanism may be a focal plane shutter arranged on the side of the camera body 10, or a lens shutter arranged on the side of the lens barrel 20. In the case the shutter mechanism is arranged on the side of the camera body 10, the shutter mechanism is controlled mainly by the control section on the body side. In the case the shutter mechanism is arranged on the side of the lens barrel 20, the shutter mechanism is controlled mainly through the lens control section 21 under the control of the control section on the body side.

Furthermore, the lens barrel 20 used in the camera 1 of the present embodiment is configured as a high power optical zoom lens, but an electronic zoom function may be provided, alternatively (or in addition), to the side of the camera body 10. As the structure for realizing this electronic zoom function, means that is generally and conventionally used may be used, such as application of predetermined image processing on image data acquired by the image pickup device 13 by the image processing section 11b or the like of the signal processing control section 11. Moreover, a configuration is also possible according to which the lens barrel 20 itself is not a high power optical zoom lens, but a high power electronic zoom function is provided to the side of the camera body 10. Accordingly, with the camera 1, the zoom control section 26a for controlling the optical zoom function may be provided, or an electronic zoom control section for controlling the electronic zoom function may be provided instead (or in addition).

Figure 2:
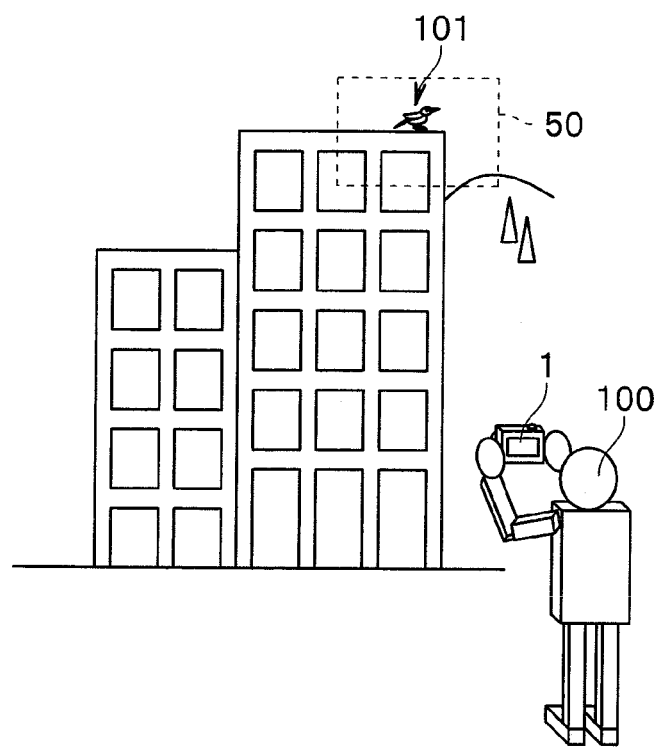
FIG. 2 is a conceptual diagram showing photographing of a desired object by a photographer using the photographing apparatus (camera) of FIG. 1.
Figure 3:
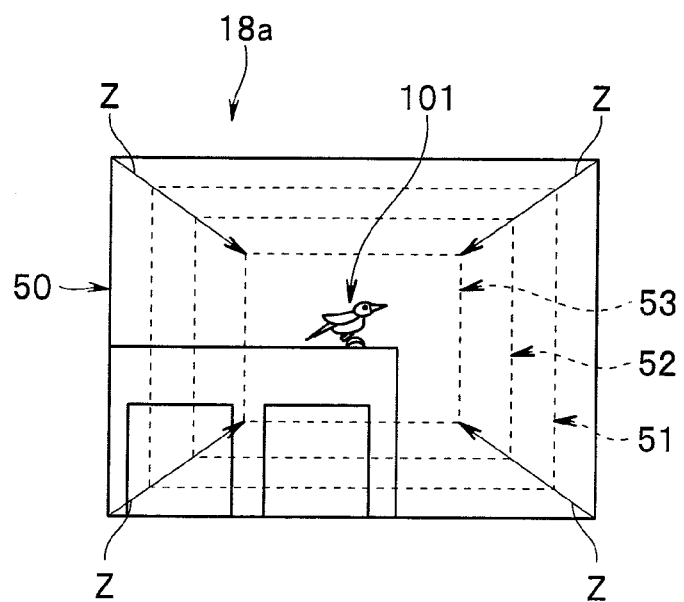
FIG. 3 is a conceptual diagram schematically showing the range of each ideal image which may be acquired when ideal zooming to the long focal range side is performed from zoom setting on the short focal range side in the state of FIG. 2.

A case where a radical zoom operation or a swift electric zoom operation is performed, at the time of photographing using the camera 1 of the present embodiment configured in the above manner, from a state where the lens 26 is set to a wide-angle side will be described below. FIG. 2 is a conceptual diagram showing photographing of a desired object by a photographer using the camera of the present embodiment. FIG. 3 is a conceptual diagram schematically showing the range of each ideal image which may be acquired when ideal zooming to the long focal range side is performed from zoom setting on the short focal range side in the state of FIG. 2.

The state shown in FIG. 2 is as below. That is, a photographer 100 is holding the camera 1 toward the scene in front of the photographer 100 to perform photographing. In this case, a state is shown where the photographer 100 is trying to perform photographing with a bird 101 which is far off in the scene in front of the photographer (at the top of the building in the example of FIG. 2) as the main object, and is holding the lens barrel 20 of the camera 1 in this direction. Note that a frame 50 shown by a dotted line in FIG. 2 indicates a predetermined focus region of the camera 1, such as a region that is to be photographed when the optical zoom of the lens barrel 20 is set near the minimum focal length or about two to three times the minimum focal length, for example.

FIG. 3 schematically shows an entire display region 18a of the display section 18 of the camera 1 at this time. Then, in the case the photographer 100 is to further zoom in from the state shown in FIG. 3, the main object 101 is preferably always positioned near the center of the image. That is, when zooming is performed in the state where the image in the frame 50 in FIG. 3 is displayed on the display panel of the display section 18, normally, the photographing region narrows in the manner shown by arrows Z extending from four corners of the display region 18a in FIG. 3. That is, during the zooming, the photographing region changes to become narrower in the order of dotted-line frames 51, 52, and 53 shown in FIG. 3. Note that during the zooming, the viewfinder image that is actually displayed on the display panel of the display section 18 is such that the image in the region shown by the dotted-line frame 51, 52 or 53 at each time point is enlarged so as to fill the entire display region on the display panel.

As described, in the case appropriate zooming is performed in a state where the main object 101 that the photographer 100 wants to photograph is known, and the main object 101 is positioned at the center of the photographing region, that is, at substantially the center of the viewfinder image displayed on the display section 18, the way the photographing region changes due to the zooming may be predicted by the signal processing control section 11 of the camera 1.

Figure 4:
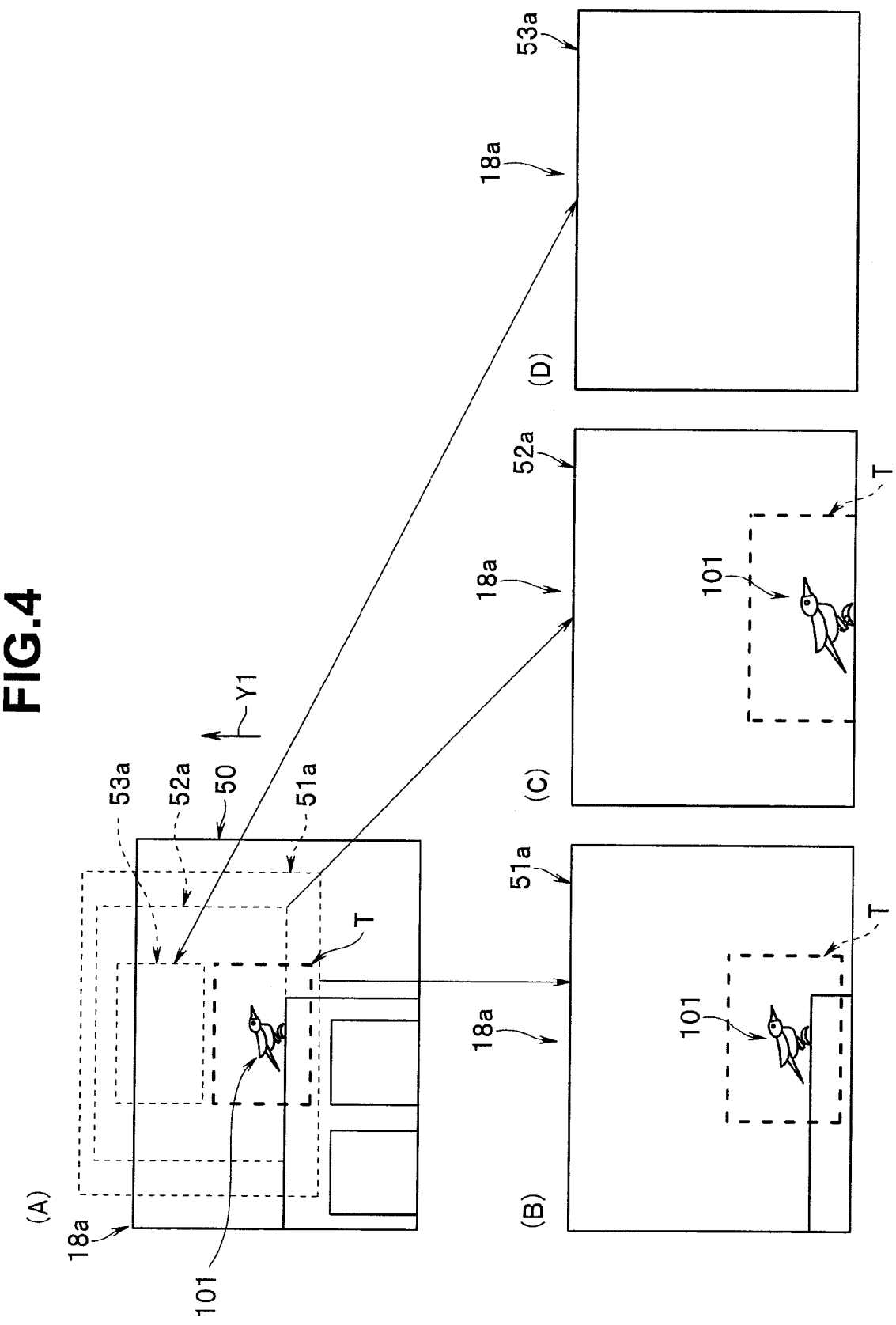
FIG. 4 is a conceptual diagram showing a change in a viewfinder image of a conventional camera where camera shake has occurred at the time of zooming in the state of FIG. 2.

However, in the case of photographing while setting to the long focal range side of the high power zoom function, since the photographing range is extremely narrow, if photographing is performed with the camera 1 being held by hand, the main object, which is the photographing target, may move out of the range of the viewfinder image and be lost by even a slight camera shake or the like. FIG. 4 shows such a state.

FIG. 4 is a conceptual diagram showing a change in the viewfinder image where camera shake has occurred at the time of zooming in the state of FIG. 2. A photographer has to apply a force on the operation member of the camera to perform zooming. This operation tends to cause the camera to tremble. It is difficult for a photographer to perform this operation while maintaining the attitude of the camera. FIG. 4(A) shows a display state of a viewfinder image at the time of start of zooming (the state same as in FIG. 3), and a change in the photographing region caused by zooming. The frame 50 shown by a solid line corresponds to the frame 50 in FIG. 3. It is assumed that zooming is performed in this state, and the direction of the camera 1 is shifted in the direction of an arrow Y1 shown in FIG. 4(A) during the zooming. In this case, the photographing region changes according to the zooming in such a way as to become narrower in the order of dotted-line frames 51a, 52a, and 53a shown in FIG. 4(A). Note that a dotted-line frame shown by a reference sign T in FIGS. 4(A), 4(B), and 4(C) is a target frame displayed so as to clearly indicate the main object 101. This target frame T is displayed at the time of an operation of the photographer 100 of specifying the main object 101 desired to be photographed, or is displayed near the object detected by the face detection section 31, for example. In the state in FIG. 4(A), the target frame T including the main object 101 is assumed to be set at substantially the center of the viewfinder image.

Now, if a shift in the direction of the arrow Y1 occurs during the zooming from the state in FIG. 4(A), as described above, the viewfinder image corresponding to the dotted-line frame 51a in FIG. 4(A) changes to that shown in FIG. 4(B). In the state in FIG. 4(B), the target frame T including the main object 101 which is enlarged from the state in FIG. 4(A) is at a position slightly shifted from substantially the center of the viewfinder image (in the present example, a position near the lower end of the viewfinder image).

A viewfinder image corresponding to the dotted-line frame 52a in FIG. 4(A) after further zooming is as shown in FIG. 4(C). In the state in FIG. 4(C), the target frame T including the main object 101 enlarged from the state in FIG. 4(B) is displayed at a position further near the lower end of the viewfinder image.

A viewfinder image corresponding to the dotted-line frame 53a in FIG. 4(A) after even further zooming is as shown in FIG. 4(D). In the state in FIG. 4(D), the image is further enlarged from the state in FIG. 4(C), and thus, the target frame T including the main object 101 is on the outside of the lower end of the viewfinder image, that is, the main object 101 is completely lost from the viewfinder image.

As described, in the case of performing zooming while setting the main object 101, as a faraway object which is a target desired to be photographed, at substantially the center of the viewfinder image, for example, a slight camera shake or the like may cause the main object 101 to be lost from the viewfinder image in the long focal range of the high power zoom function.

Accordingly, the camera 1 of the present embodiment includes means for displaying a target mark allowing grasping of the position of the main object 101 in the viewfinder image at all times, and for performing an image comparison process of comparing each frame image of live view images sequentially displayed as the viewfinder image and a corresponding ideal image, to determine shifting of the camera 1 (viewfinder image) caused by camera shake or the like occurring during zooming, and display visual information regarding the amount of shift, the shifting direction and the like in the viewfinder image, and to notify the photographer of the occurrence of camera shake or the like.

Figure 5:
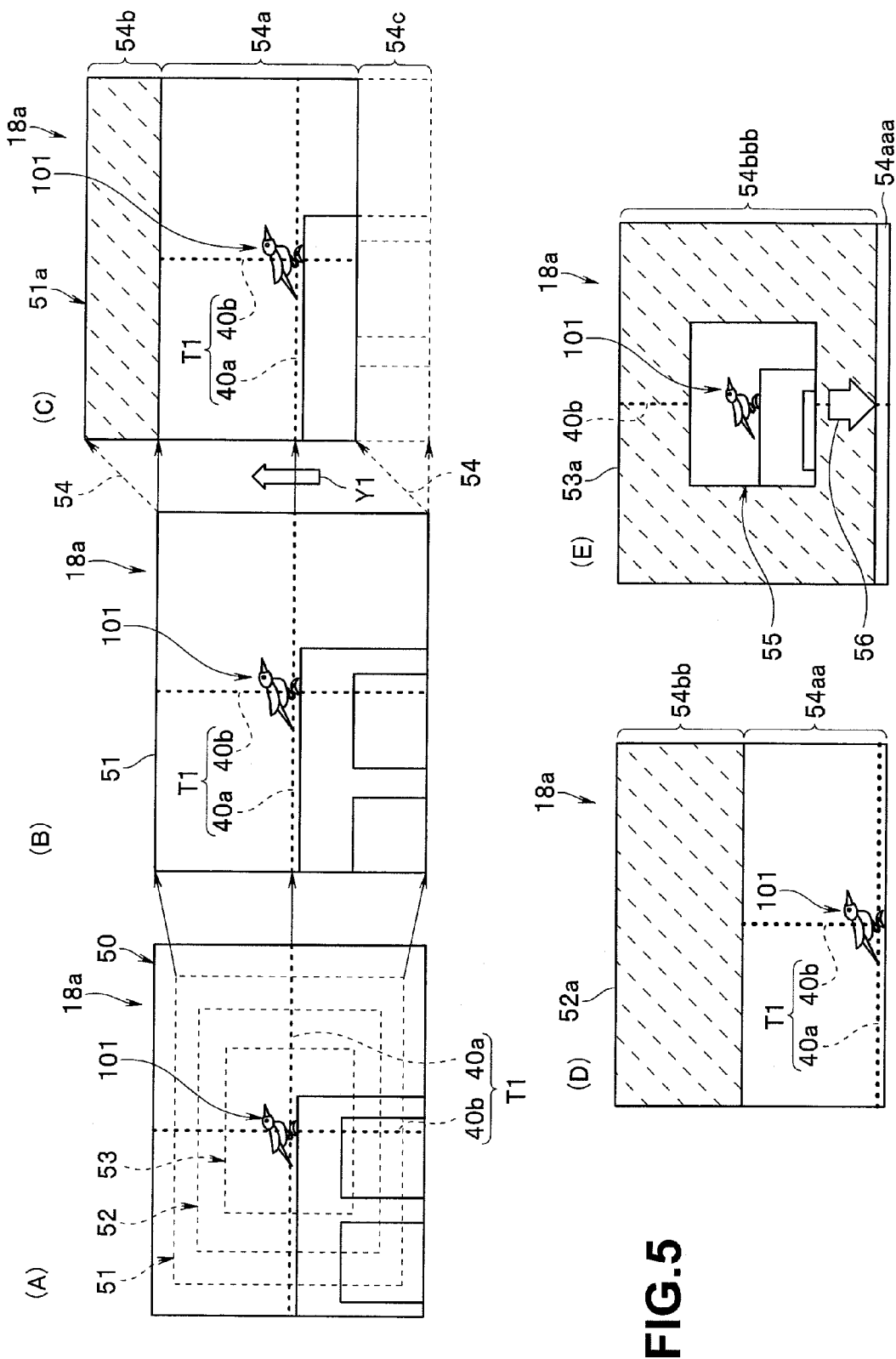
FIG. 5 is a diagram for describing a case where a shift in a viewfinder image has occurred during zooming, with respect to the photographing apparatus (camera) of FIG. 1.

FIG. 5 is a diagram for describing a case where a shift in the viewfinder image has occurred during zooming, with respect to the camera 1 of the present embodiment. FIG. 5(A) shows a viewfinder image at a certain time point during zooming (corresponding to the frame 50 in FIG. 3), and changes in the viewfinder image which would take place if zooming to the long focal range from this state is performed are shown by dotted lines. In this case, a target mark T1 formed by a horizontal line 40a and a vertical line 40b is displayed in the viewfinder image. The target mark T1 is displayed with the point of intersection being at or near the main object 101, that is, being aligned with the main object 101. The target mark T1 moves to follow the main object 101 in the viewfinder image, according to the image movement of the main object 101 in the viewfinder image caused by camera shake or the like on the camera 1 or, in the case the main object 101 is a moving object, according to the image movement in the viewfinder image according to the actual movement.

FIG. 5(B) is a diagram showing a state where the viewfinder image shown by the dotted-line frame 51 in FIG. 5(A) is displayed in an enlarged manner on the display panel of the display section 18. As the viewfinder image at this point, an ideal image in an ideal image frame 51 is displayed. At this time, the point of intersection of the target mark T1, that is, the main object 101, is positioned at substantially the center of the viewfinder image.

FIG. 5(C) illustrates a viewfinder image obtained when camera shake or the like is imposed in the state in FIG. 5(B), while superimposing the ideal image. Note that the viewfinder image shown in FIG. 5(C) corresponds to the dotted-line frame 51*a* in FIG. 4(A) and FIG. 4(B). A case where camera shake or the like occurs in the state in FIG. 5(B), and the direction of the camera 1 is shifted in the direction of the arrow Y1 (upward) shown in FIG. 5 is assumed, for example. At this time, a positional change as shown by the reference sign 54 takes place with respect to the viewfinder image in FIG. 5(B). The frame region indicated by regions 54*a*+54*c* in FIG. 5(C) here is an ideal image where there is no camera shake or the like. When a change indicated by the reference sign 54 takes place with respect to this ideal image, in the direction of the camera 1 due to camera shake or the like, the viewfinder image with the camera shake or the like will be the range indicated by the frame region of regions 54*a*+54*b* in FIG. 5(C). The viewfinder image indicated by the regions 54*a*+54*b* here is referred to as a camera-shake image. Note that the region 54*a* is an image region including the main object 101. Also, the region 54*b* is an image region needlessly displayed according to the camera shake or the like. That is, the region 54*b* is a region which is not supposed to be displayed, as opposed to the ideal image, and is a difference region between the ideal image and the camera-shake image (a region which would not be observed if there were no camera shake). Furthermore, the region 54*c* is a region of the ideal image which is not displayed due to the camera shake. That is, the region 54*c* is a region which is supposed to be displayed in the ideal image.

Furthermore, it can be seen, simply by looking at the viewfinder image, that the point of intersection of the target mark T1 (that is, the main object 101) is shifted from substantially the center to a lower side in the camera-shake image (54*a*+54*b*) in FIG. 5(C). Furthermore, the camera 1 of the present embodiment performs auxiliary displaying, such as semi-transparent display or color inversion display, of the unnecessary difference region 54*b* in the camera-shake image (viewfinder image) in FIG. 5(C) (the region 54*b* is indicated by dotted-line hatching in FIG. 5(C)), and performs clear display (explicit display) allowing identification of the region 54*b* and other region 54*a* at a glance. In addition, by changing the display of the target mark T1, for example, by changing the thickness of the line or the color of display according to the state of shifting of the direction of the camera 1, the occurrence of camera shake or the like may be made known. In the example shown in FIG. 5(C), the target mark T1 is displayed slightly thicker than in FIG. 5(B). In this case, of the target mark T1, only the mark for the direction of the camera shake or the like, that is, the horizontal line 40*a* in the example in FIG. 5(C), is displayed by a thick line.

As described above, with the camera 1 of the present embodiment, it can be seen that the direction of the camera 1 is shifted with respect to the main object 101, simply by looking at the viewfinder image. At the same time, the direction of the shift and the amount of the shift of the camera 1 may also be easily identified. Accordingly, the photographer may easily correct the direction of the camera 1 so as to achieve an ideal image where the main object 101 is positioned substantially at the center (or at a desired position). Zooming may be optical zooming or electronic zooming, and if switching of the region or the observation range is expressed by the term "change in the observation angle of view", it is apparent that application to an image display apparatus such as an electronic telescope is also possible. That is, application of this invention is possible if an image display apparatus capable of changing an observation angle of view and acquiring an image further includes an ideal image creation section for creating a plurality of pieces of ideal image data that are created by predicting ideal angle-of-view changed images at a time of narrowing the angle of view, and an image comparison section for sequentially comparing the ideal image and an image acquired based on an angle-of-view change operation. Moreover, what has been described with reference to FIGS. 4 and 5 may be achieved if the image comparison section identifies a difference region between the ideal image and an acquired image based on a result of an image comparison process, and there is a display control section for displaying, as the auxiliary displaying, the difference region in a manner allowing viewing. Display allowing viewing may also be performed by using a color that is clearly different from that of the object so as to enable distinction from the frame, instead of the display being in black or of semi-transparent display. Also, a guide may be displayed at this portion.

FIG. 5(D) shows an example of the viewfinder image where further shifting in the direction of the camera 1 has taken place from the state in FIG. 5(C). Note that the viewfinder image shown in FIG. 5(D) corresponds to the dotted-line frame 52*a* in FIG. 4(A) and FIG. 4(C). A difference region 54*bb* in FIG. 5(D) is greater than the state in FIG. 5(C) (region 54*b*<region 54*bb*). That is, the state in FIG. 5(D) indicates that the amount of shift of the direction of the camera 1 is increased compared to the state in FIG. 5(C). Accordingly, the range of a region 54*aa* in FIG. 5(D) is smaller compared to that of the region 54*a* in FIG. 5(C) (region 54*a*>region 54*aa*). Also in this case, the difference region 54*bb* is clarified by the auxiliary displaying, such as semi-transparent display or color inversion display, and also, the target mark T1 is displayed being aligned with the main object 101.

FIG. 5(E) shows an example of the viewfinder image where further shifting has taken place from the state in FIG. 5(D). Note that the viewfinder image shown in FIG. 5(E) corresponds to the dotted-line frame 53*a* in FIG. 4(A) and FIG. 4(D). That is, a state is shown where the main object 101 is completely lost from the viewfinder image. A difference region 54*bbb* in FIG. 5(E) is greater than in the state in FIG. 5(D) (region 54*bb*<region 54*bbb*), and the difference region 54*bbb* occupies almost the entire viewfinder image. When this state is reached, the camera 1 of the present embodiment performs auxiliary displaying, such as semi-transparent display or color inversion display, of the difference region 54*bbb*, as shown in FIG. 5(E). In addition, an image (iconized image) obtained by reducing a base image that is temporarily recorded in advance to a predetermined size is displayed at substantially the center of the viewfinder image, and also, auxiliary displaying of an arrow icon 56 or the like for indicating the direction of the shift is performed. This arrow icon 56 is an indicator for indicating that the main object 101 is present outside the display range of the display panel, in the direction indicated by the arrow. Display control may also be performed of changing the size of the arrow icon 56 according to the amount of shift in the direction of the camera 1.

As described above, the camera 1 of the present embodiment displays, in the image (viewfinder image) displayed by the display section 18 at the time of photographing operation, the target mark T1 which is formed by the horizontal and vertical lines 40*a* and 40*b* and which takes the main object 101 detected under a predetermined condition (for example, the face detection function or the like) as the point of intersection and causes the target mark T1 to follow the image, and also, in the case camera shake or the like occurs during zooming, and the direction of the camera 1 is shifted from the main object 101 (in the case the viewfinder image is shifted with respect to the ideal image), the camera 1 performs, on the viewfinder image on the display section 18, auxiliary displaying (semi-transparent display or the like) which allows clear grasping of the shift region (54b, 54bb, 54bbb) with respect to the ideal image. Thus, the photographer is enabled to easily know the direction of the shift and the amount of the shift of the camera 1 with respect to the main object 101 by an action that is, in a normal case, inevitably performed, that is, the action of observing the viewfinder image. Accordingly, even if, in the case zooming using the high power zoom function is performed, the direction of the camera 1 is shifted due to the camera shake or the like, or the main object 101 is completely lost from the viewfinder image, the direction of the camera 1 may be reliably corrected, and the main object 101 may be reliably positioned at substantially the center of the viewfinder image or at a desired position within the display range of the viewfinder image, and thus, an ideal image may be photographed.

Figure 6:
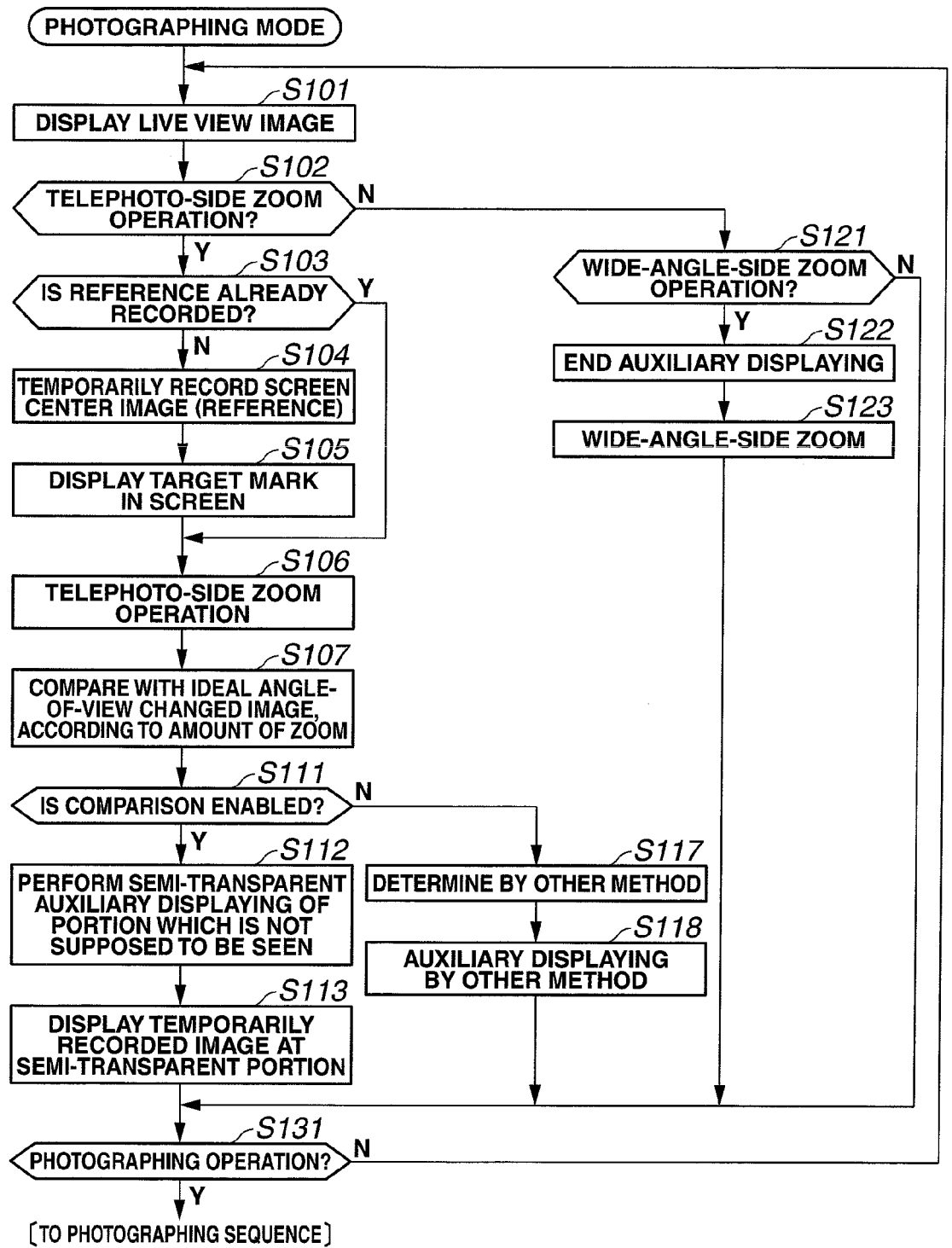
FIG. 6 is a flowchart showing a process sequence for a photographing mode of the photographing apparatus (camera) of FIG. 1.

Next, a process sequence for realizing the effect of the display control and the like of a viewfinder image as described above will be described with reference to the flowchart of FIG. 6. FIG. 6 is a flowchart showing a process sequence for a photographing mode of the photographing apparatus (camera) of the present embodiment.

First, it is assumed that the camera 1 of the present embodiment is active with the power being on, and the operation mode is set to the photographing mode.

In this state, in step S101, the signal processing control section 11 controls the image pickup section including the image pickup device 13, the lens 26 and the like, the display section 18, and the like to perform a live view image display process.

Then, in step S102, the signal processing control section 11 monitors an instruction signal from the operation section 15, the touch panel 18b, or the like, and also, checks whether a zoom operation from the short focus (wide angle) side to the long focus (telephoto) side (the operation is referred to as a telephoto-side zoom operation) is performed, based on a determination result of the zoom determination section 11a or the like. The telephoto-side zoom operation at this time is assumed to be performed in the following situation. That is, the photographer is holding the camera 1 with the optical axis of the lens 26 facing the main object which is desired to be photographed.

At this time, the main object 101 is captured in the viewfinder image of the camera 1 (in the live view image on the display section 18), and the main object 101 is positioned near substantially at the center of the viewfinder image.

Then, when the photographer performs an operation, such as an autofocus operation, which is to be performed before a normal photographing operation with the main object 101 captured in the viewfinder image, and the focus is on, detection of face, color, pattern or the like is performed by the object detection section (face detection section 31 or the like) with respect to the main object 101, and identification of the main object 101 is performed, and at the same time, control is performed so as to automatically track the main object 101. The main object 101 is set by the flow of such an operation. Accordingly, as the main object setting section which is means for setting the main object 101, the object detection section (31), the focus control section (26b) for performing the autofocus operation, and the like are included.

In this process of step S102, if it is confirmed that a zoom operation from the short focus (wide angle) side to the long focus (telephoto) side has been performed, the process proceeds to the next step S103. If such operation is not confirmed, the process proceeds to step S121.

In step S103, the signal processing control section 11 checks whether or not predetermined reference image data is already recorded in the temporary recording section 16. This reference image data is image data indicating a reference image created by the ideal image creation section 11i. Here, in the case it is confirmed that the reference image data is not yet recorded, the process proceeds to the next step S104. In the case it is confirmed that the reference image data is already recorded, the process proceeds to step S106.

In step S104, the ideal image creation section 11i of the signal processing control section 11 performs a reference image recording process of recording a reference image including the main object 101 that is already set at the time of start of the telephoto-side zoom operation performed in the process of step S102, based on the live view image data currently displayed, that is, the output data from the image pickup section. That is, this reference image recording process is a process of clipping, as the reference image, an image of a predetermined region at substantially the center of the viewfinder image immediately before the start of the telephoto-side zoom operation of the process of step S102, and temporarily recording the reference image data in the temporary recording section 16.

Then, in step S105, the signal processing control section 11 performs a display control process of controlling the image pickup section, the display section 18 and the like, and displaying a predetermined target mark on the viewfinder image or the live view image currently displayed on the display section 18. The target mark here is a mark, an icon or the like for clearly indicating the main object (101) which has been set, on the display screen of the display section 18. Display image data, icon data or the like for displaying the target mark is stored in advance in a built-in memory (not shown) or the like provided to either a part of the recording section 14 or inside the camera body 10. The target mark is the frame line indicated by the reference sign T in the example in FIG. 4, and is two straight lines, the horizontal and vertical lines 40a and 40b, indicated by the reference sign T1 in the example in FIG. 5.

In step S106, the signal processing control section 11 controls the lens control section 21 through the communication sections 12 and 22. The lens control section 21 controls the zoom control section 26a through the zoom drive section 24a, and performs zooming to the long focus (telephoto) side of the lens 26 (telephoto-side zoom operation process). Then, the process proceeds to step S107.

In step S107, the image comparison section 11d of the signal processing control section 11 performs an image comparison process of comparing a plurality of pieces of image data (output data from the image pickup section) separately acquired according to the amount of zoom by the telephoto-side zoom operation in step S106 and an ideal image corresponding to the amount of zoom of each piece of image data.

Subsequently, in step S111, the signal processing control section 11 checks whether or not image comparison is possible, based on the result of the image comparison process of step S107. In the case it is confirmed here that image comparison is possible, the process proceeds to the next step S112. In the case it is confirmed that image comparison is not possible, the process proceeds to step S117.

Next, in step S112, the signal processing control section 11 controls the display section 18 through the display control section 11e, and performs auxiliary displaying (see FIGS. 5(C), 5(D) and 5(E)) of displaying a portion which is not supposed to be seen (the difference region; see FIG. 5(C)) in a semi-transparent manner or color-inverted manner, for example. The mode of the auxiliary displaying may be any mode as long as a region which is supposed to be seen (first region) and the difference region (second region) are displayed in such a way that the photographer is enabled to distinguish between the two. For example, the brightness, the hue, or the luminance of the two regions is made different. Lines or frames indicating the two regions may also be displayed.

Now, in the case a state where the direction of the camera 1 is greatly shifted and the difference region occupies almost the entire viewfinder image is reached, the signal processing control section 11 controls the display section 18 through the display control section 11e in the next step S113 in the same manner, and superimposes, and displays, a temporarily recorded image that is temporarily recorded in the temporary recording section 16 by the process of step S104, that is, the reference image, on the difference region (semi-transparent display portion or color-inverted display portion) on the display section 18 (see FIG. 5(E)).

On the other hand, in the case the process proceeds to step S121 without the zoom operation from the short focus (wide angle) side to the long focus (telephoto) side being confirmed in the process of step S102, the signal processing control section 11 monitors, in step S121, an instruction signal from the operation section 15, the touch panel 18b or the like, and also, checks whether or not the zoom operation from the long focus (telephoto-side) to the short focus (wide angle) side is performed, based on the result of determination by the zoom determination section 11a. In the case it is confirmed here that the zoom operation from the long focus (telephoto) side to the short focus (wide angle) side is performed, the process proceeds to the next step S122. If such operation is not confirmed, the process proceeds to step S131.

In step S122, the signal processing control section 11 controls the display section 18 or the like through the display control section 11e to end auxiliary displaying, such as auxiliary semi-transparent display (see FIGS. 5(C) and 5(D)) or temporarily recorded image display (see FIG. 5(E)), that is being displayed on the display section 18, and displays only the normal live view image.

Subsequently, in step S123, the signal processing control section 11 cooperates with the lens control section 21 through the communication sections 12 and 22 and controls the zoom control section 26a through the zoom drive section 24a, and performs zooming to the short focus (wide angle) side of the lens 26. Then, the process proceeds to step S131.

Then, in step S131, the signal processing control section 11 monitors an instruction signal from the operation section 15, the touch panel 18b or the like, and checks whether an operation for performing the photographing operation is performed and an instruction signal to that effect is issued. Here, in the case the photographing operation is not confirmed, the process proceeds to step S101 described above, and the subsequent processes are repeated. On the other hand, in the case the photographing operation is confirmed, the process transitions to a predetermined photographing process sequence. Note that the photographing process sequence of the camera 1 of the present embodiment is assumed to be the same as the process sequence of a conventional, general photographing apparatus (camera), and illustration and description of the details are omitted.

Note that, as the case where it is determined in the process of step S111 that image comparison is not possible, the following cases are conceivable: i.e. a case where an image actually acquired by the telephoto-side zoom operation of the process of step S106 and the ideal image corresponding to the amount of zoom of the image are greatly different, a case where the actually acquired image and the ideal image are greatly different because of occurrence of a great shift in the direction or the like of the camera 1 during zooming, a case where the main object is a moving object moving at a high speed, and the like. In these cases (cases where image comparison is not possible), the process proceeds to step S117, as described above.

Then, in step S117, the signal processing control section 11 performs a determination process by another method. Subsequently, in step S118, the signal processing control section 11 performs predetermined auxiliary displaying by the other method according to the process of step S117. Note that the processes of steps S117 and S118 (the other method) will be described in detail below as a second embodiment of the present invention.

As described above, according to the first embodiment, when a main object 101 desired to be photographed is set in the viewfinder image (the live view image on the display section 18) at the photographing apparatus (camera 1) including the high power zoom function, and then, the telephoto-side zoom operation is performed, the camera 1 creates an ideal image having the set main object 101 at the center, and performs image comparison between the ideal image and actual images that are sequentially acquired according to the zooming, to determine the amount of the shift and the direction of the shift of the actual image with respect to the ideal image. Then, the camera 1 performs, by superimposing on the live view image on the display section 18 based on the determination result, auxiliary displaying (semi-transparent display, color inversion display, etc.) for clearly indicating the amount of the shift, the direction of the shift, and the like of the direction of the camera 1.

According to this configuration, a photographer is enabled to easily keep capturing the main object 101 in the viewfinder image by correcting, with the auxiliary displaying as the guide, the direction of the camera 1 so as to position the main object 101 at substantially the center of the viewfinder image.

Also, in the case the main object 101 is completely lost from the viewfinder image, the photographer may grasp the direction of correction, the amount of correction or the like regarding the direction of the camera 1 if display of a reference image or auxiliary displaying of an arrow icon or the like is performed. Thus, the photographer may quite easily re-capture the main object 101 into the viewfinder image.

According to the first embodiment described above, the amount of the shift or the direction of the shift of the photographing apparatus, that is, the viewfinder image, caused by camera shake or the like is identified by comparing an ideal image created in advance and an image that is actually acquired. However, depending on the image comparison process, it is not possible to identify the shifting of the viewfinder image (for example, this is a case where the shift is great or the main object is a moving object; see step S111 of the flowchart of FIG. 6). In such a case, a determination process is performed by another method as described with reference to the flowchart of FIG. 6 according to the first embodiment (FIG. 6, step S117), and auxiliary displaying by the other method is performed (FIG. 6, step S118). The determination process and the auxiliary displaying of the other method will be described as the second embodiment below.

Second Embodiment

The basic configuration of a photographing apparatus of a second embodiment of the present invention is substantially the same as that of the first embodiment described above, with only a slight difference in the control sequence. Accordingly, the configuration same as that of the first embodiment described above will be denoted with the same reference signs and the detailed description will be omitted, and only the different portions will be described below.

Figure 7:
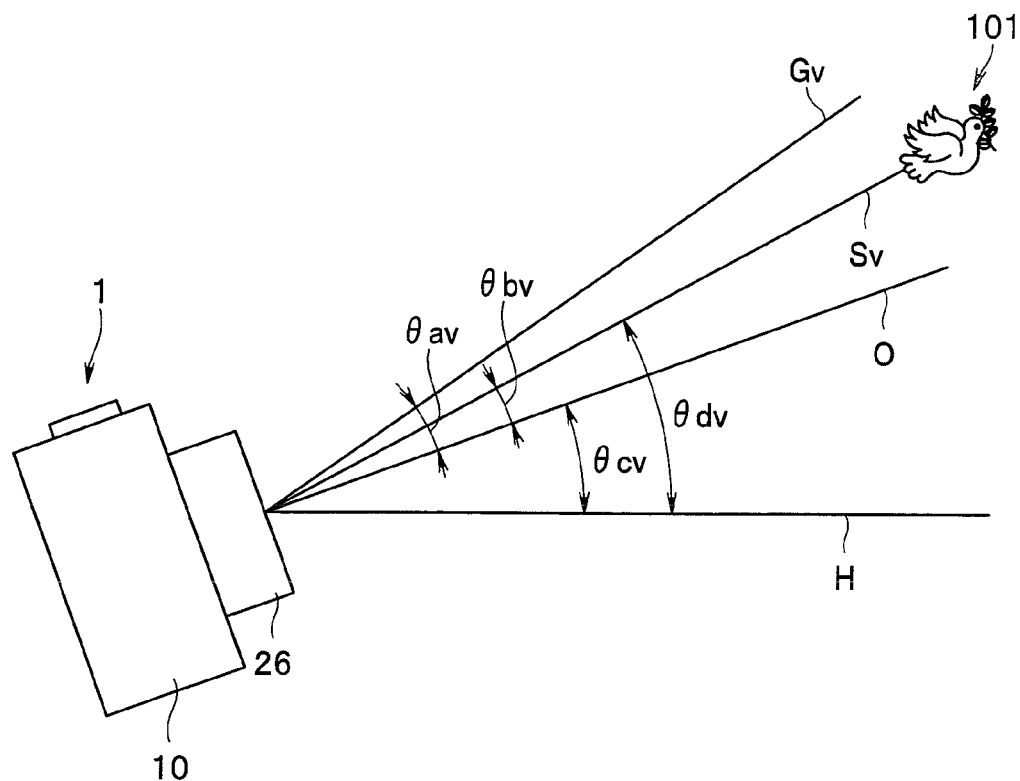
FIG. 7 is a diagram for describing a vertical attitude of a photographing apparatus (camera) of a second embodiment of the present invention where the photographing apparatus (camera) is turned toward a main object.
Figure 8:
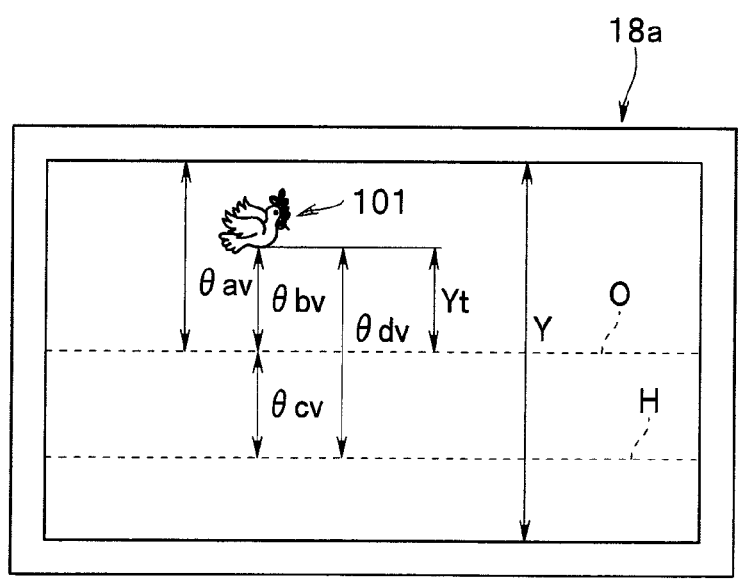
FIG. 8 is a diagram showing a viewfinder screen that is displayed on a display section of the photographing apparatus (camera) in the state of FIG. 7.
Figure 9:
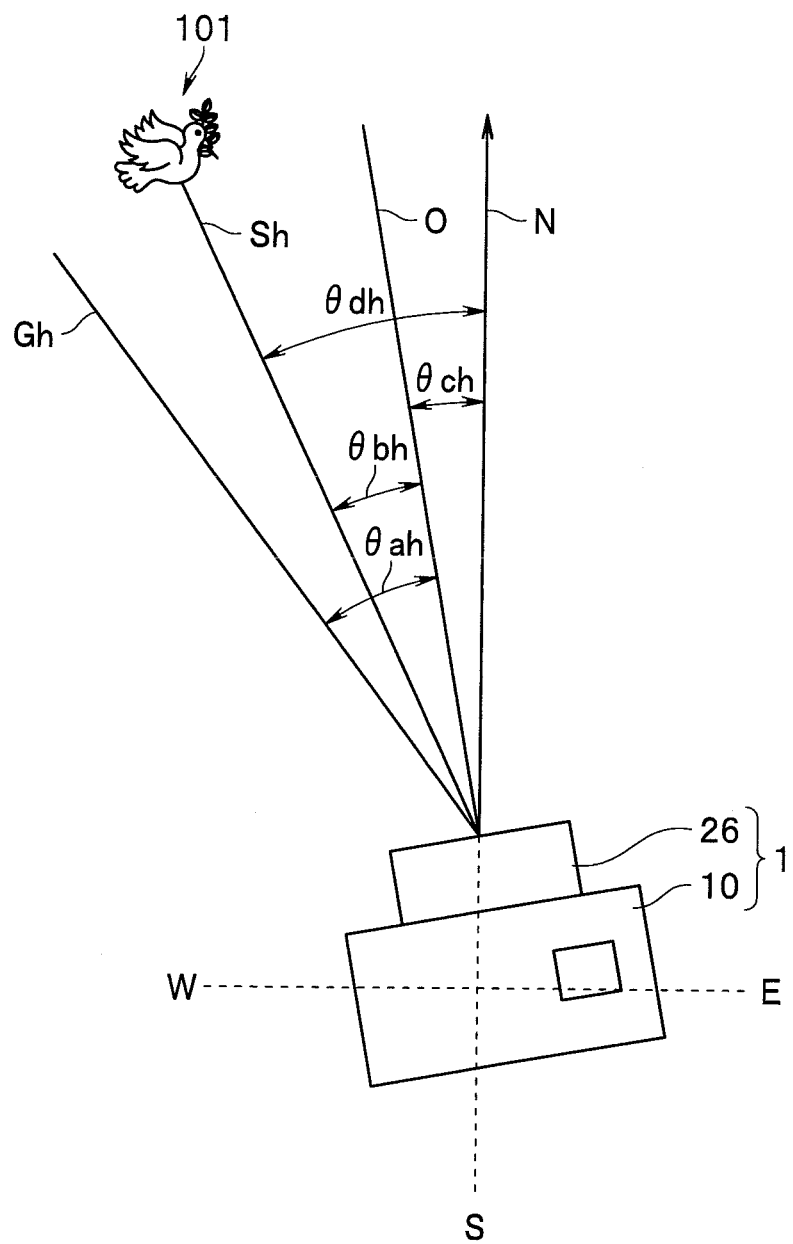
FIG. 9 is a diagram for describing a horizontal attitude of the photographing apparatus (camera) of the second embodiment of the present invention where the photographing apparatus (camera) is turned toward a main object.
Figure 10:
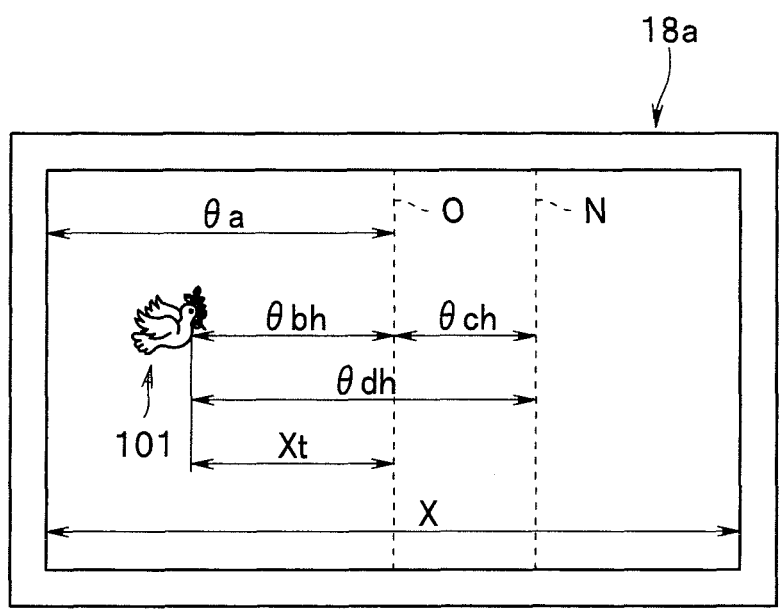
FIG. 10 is a diagram showing a viewfinder screen that is displayed on the display section of the photographing apparatus (camera) in the state of FIG. 9.

FIGS. 7 to 18 are diagrams showing the second embodiment of the present invention. Of the drawings, FIG. 7 is a diagram for describing a vertical attitude of the photographing apparatus (camera) of the present embodiment where the photographing apparatus (camera) is turned toward a main object. FIG. 8 is a diagram showing a viewfinder screen that is displayed on a display section of the photographing apparatus (camera) in the state of FIG. 7. FIG. 9 is a diagram for describing a horizontal attitude of the photographing apparatus (camera) of the present embodiment where the photographing apparatus (camera) is turned toward a main object. FIG. 10 is a diagram showing a viewfinder screen that is displayed on the display section of the photographing apparatus (camera) in the state of FIG. 9.

Figure 11:
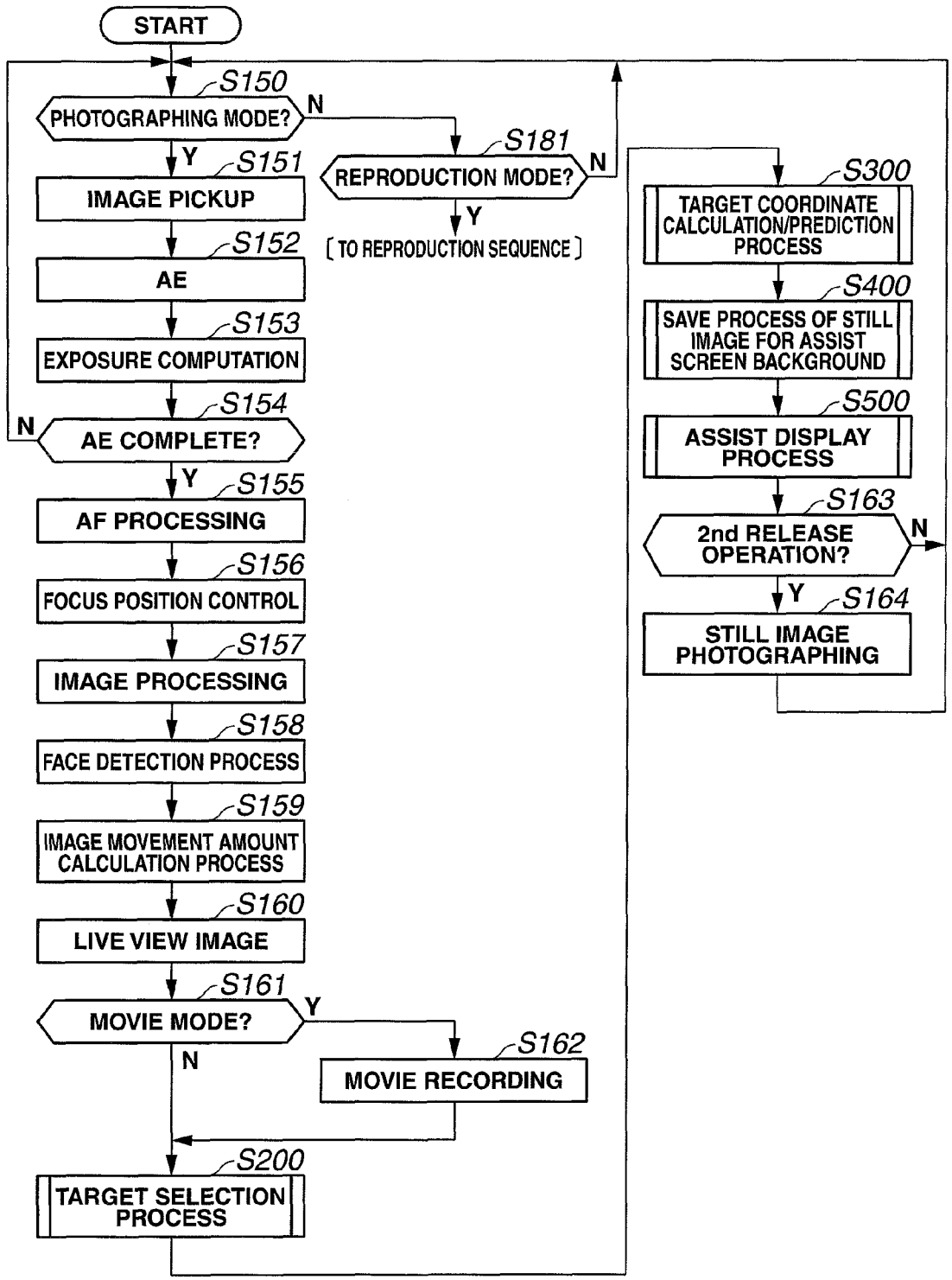
FIG. 11 is a flowchart showing a process sequence for a photographing mode of the photographing apparatus (camera) of the second embodiment of the present invention.
Figure 12:
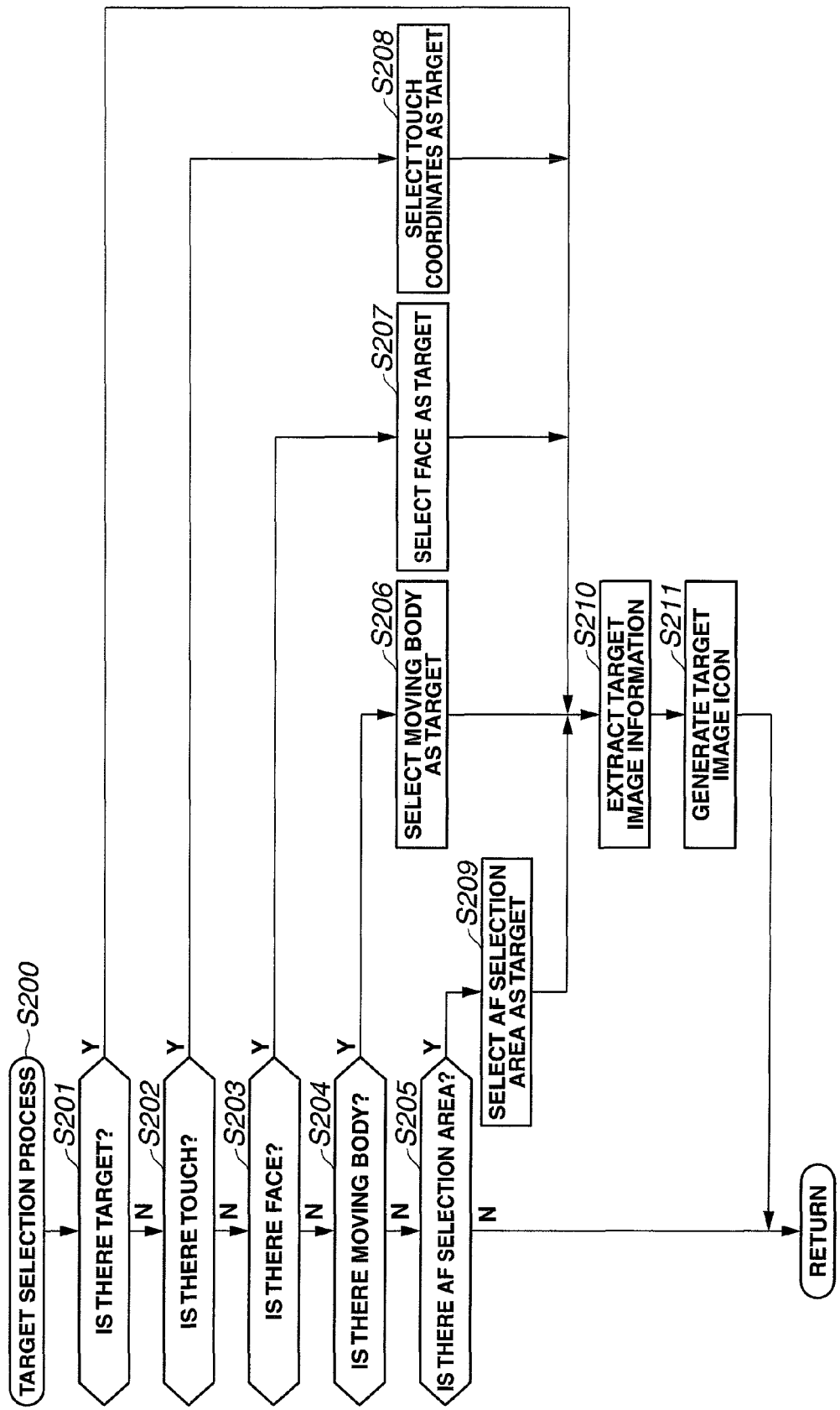
FIG. 12 is a flowchart of a target selection process subroutine of the process sequence of FIG. 11 (step S200 in FIG. 11)
Figure 13:
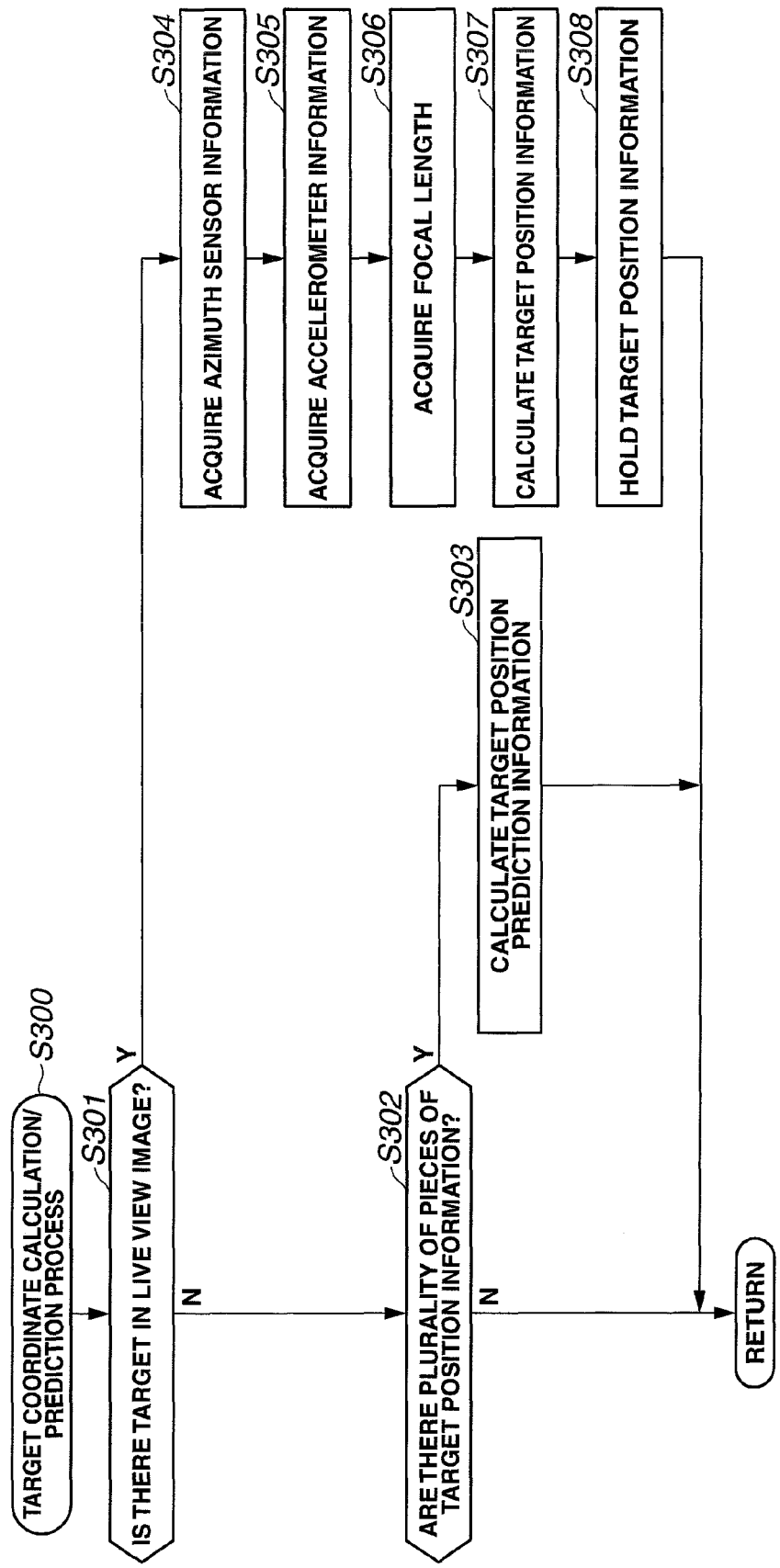
FIG. 13 is a flowchart of a target coordinate calculation/prediction process subroutine of the process sequence of FIG. 11 (step S300 in FIG. 11)
Figure 14:
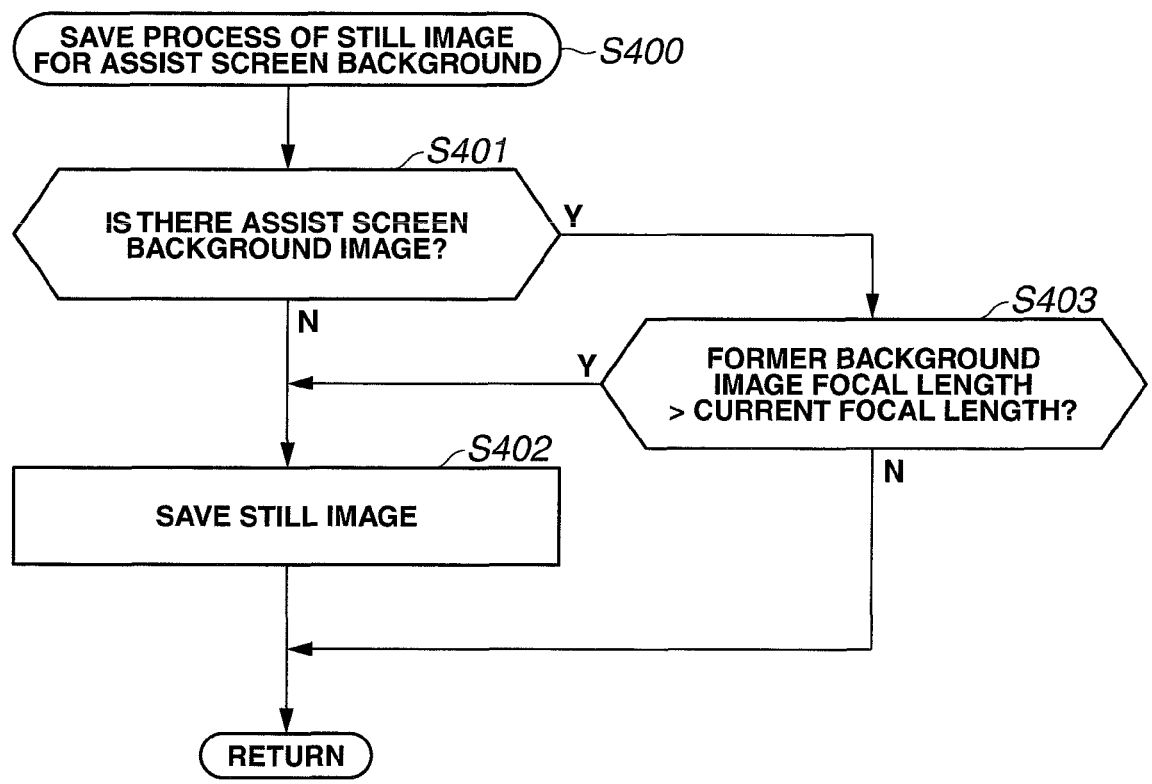
FIG. 14 is a flowchart of a subroutine for a save process of a still image for an assist screen background of the process sequence of FIG. 11 (step S400 in FIG. 11)
Figure 15:
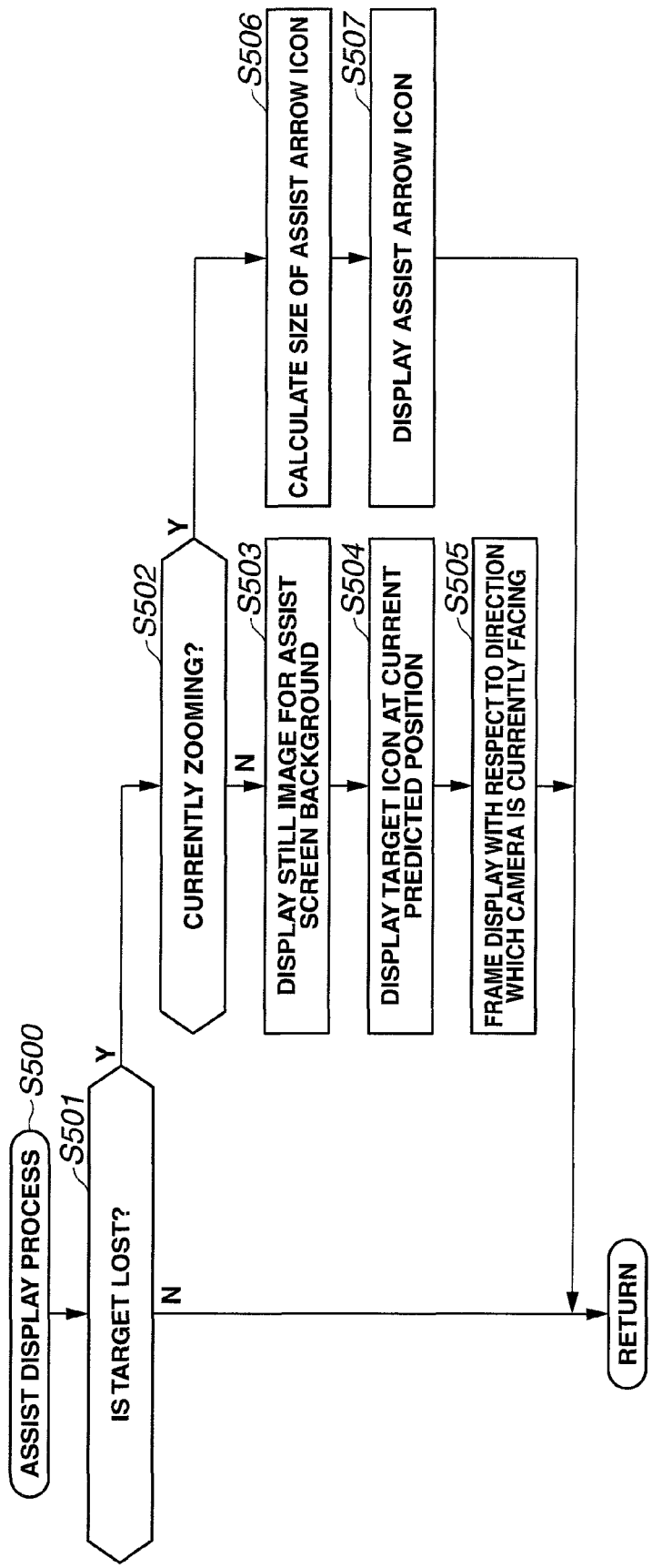
FIG. 15 is a flowchart of an assist display process subroutine of the process sequence of FIG. 11 (step S500 in FIG. 11)

FIG. 11 is a flowchart showing a process sequence for a photographing mode of the photographing apparatus (camera) of the present embodiment. FIG. 12 is a flowchart of a target selection process subroutine of the process sequence of FIG. 11 (step S200 in FIG. 11). FIG. 13 is a flowchart of a target coordinate calculation/prediction process subroutine of the process sequence of FIG. 11 (step S300 in FIG. 11). FIG. 14 is a flowchart of a subroutine for a save process of a still image for an assist screen background of the process sequence of FIG. 11 (step S400 in FIG. 11). FIG. 15 is a flowchart of an assist display process subroutine of the process sequence of FIG. 11 (step S500 in FIG. 11).

Figure 16:
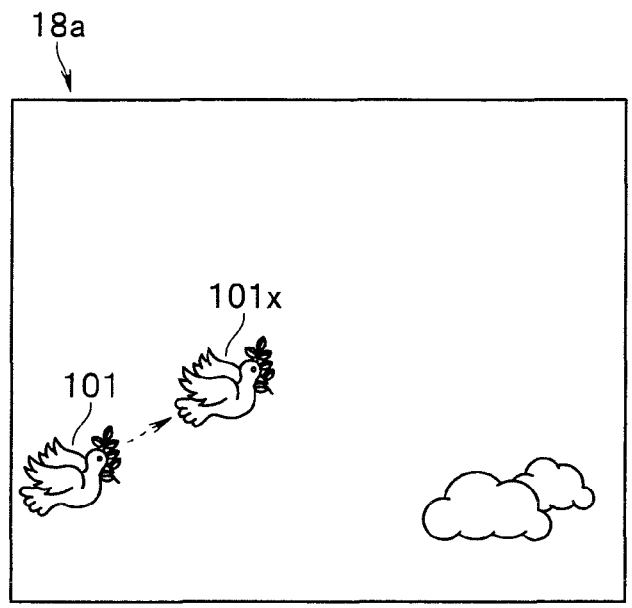
FIG. 16 is a diagram showing a viewfinder image of the photographing apparatus (camera) of the second embodiment of the present invention where a viewfinder image of a case where a zoom lens is set on the short focus side is illustrated.
Figure 17:
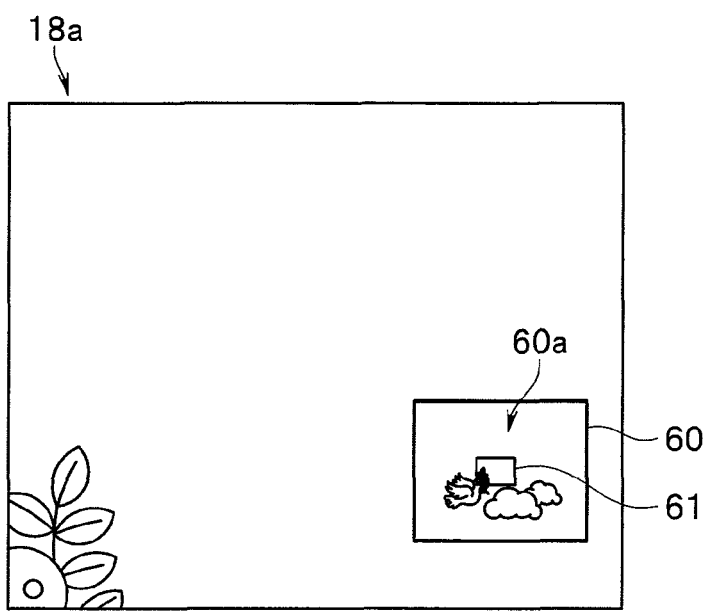
FIG. 17 is a diagram illustrating a viewfinder image of a case where the zoom lens is set to the long focus side from the state in FIG. 16.
Figure 18:
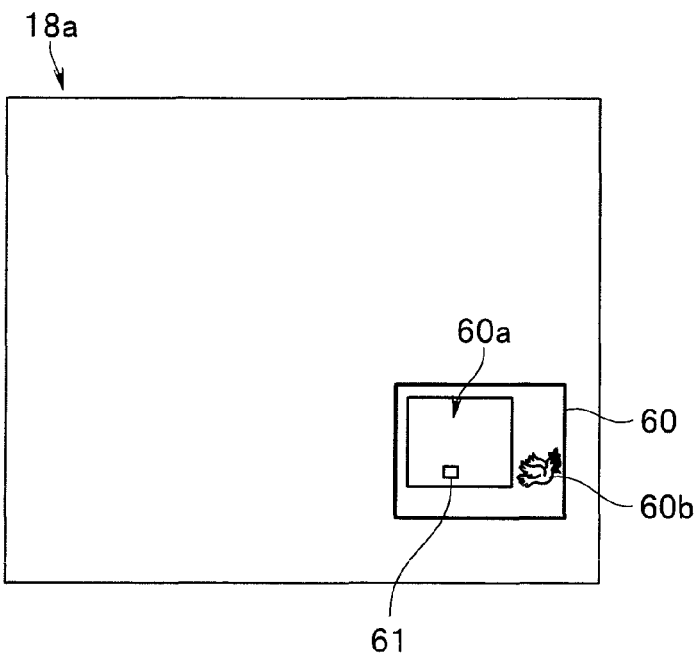
FIG. 18 is another diagram illustrating a viewfinder image of the case where the zoom lens is set to the long focus side from the state in FIG. 16.
Figure 19:
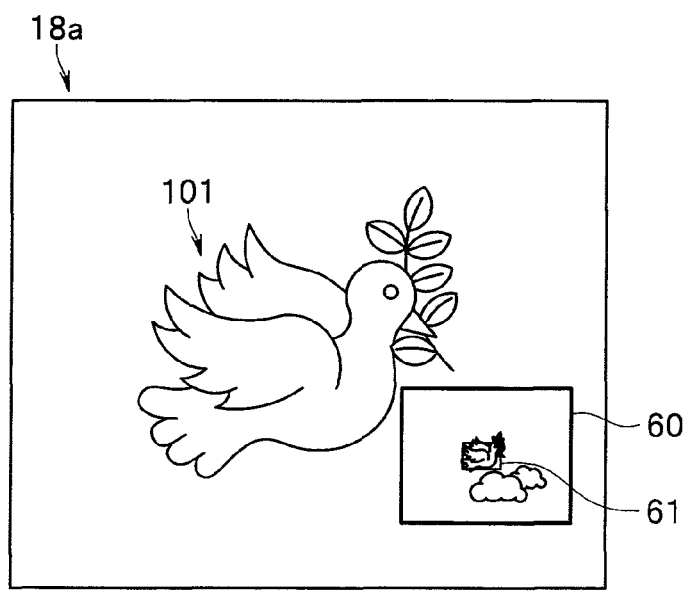
FIG. 19 is a further another diagram illustrating a viewfinder image of the case where the zoom lens is set to the long focus side from the state in FIG. 16.
Figure 20:
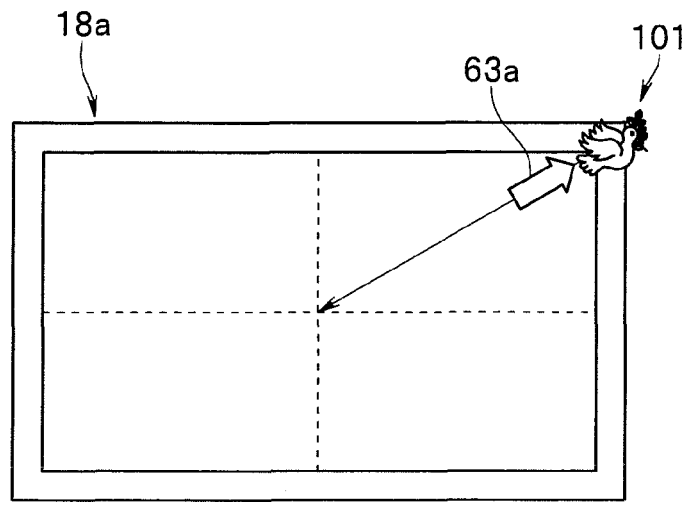
FIG. 20 is a diagram illustrating a viewfinder image of the case where the zoom lens is set to the long focus side from the state in FIG. 16, where an example of assist display in a state where a main object is lost from a display range of the display section is shown.
Figure 21:
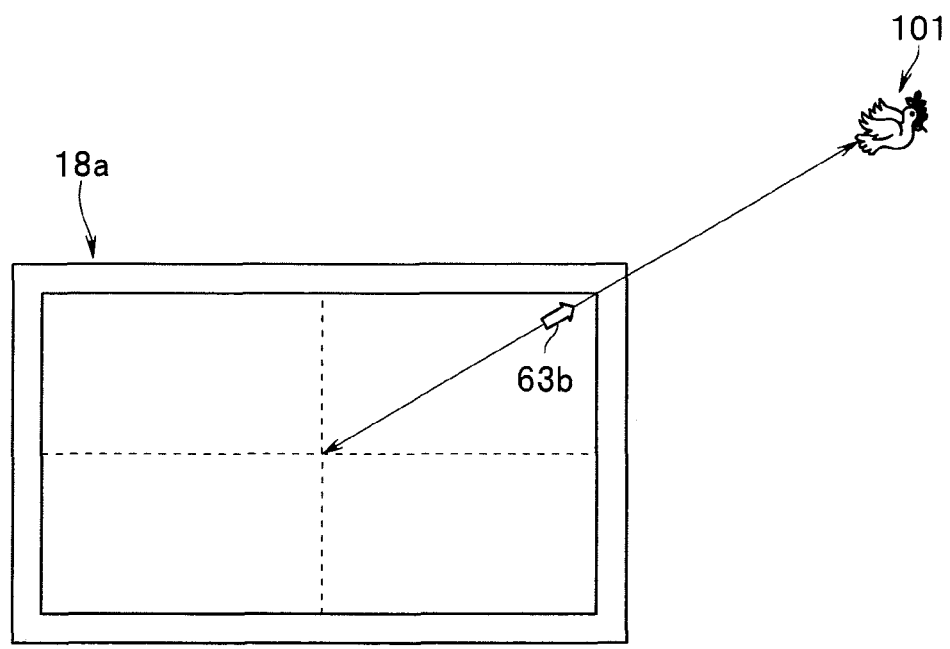
FIG. 21 is a diagram illustrating a viewfinder image of the case where the zoom lens is set to the long focus side from the state in FIG. 16, where another example of assist display in a state where a main object is lost from a display range of the display section is shown.

FIGS. 16 to 19 are diagrams showing a viewfinder image of the photographing apparatus (camera) of the present embodiment. Of the drawings, FIG. 16 is a diagram illustrating a viewfinder image where a zoom lens is set on the short focus side. FIG. 17 is a diagram illustrating a viewfinder image of a case where the zoom lens is set to the long focus side, and shows a state where the entire image is displayed on a sub-screen in a state where a main object is lost from the display range of the display section. FIG. 18 is a diagram illustrating a viewfinder image of the case where the zoom lens is set to the long focus side, and shows a state where the main object is lost from the display range of the display section. FIG. 19 is a diagram illustrating a viewfinder image of the case where the zoom lens is set to the long focus side, and shows a state where the main object is captured in the display range of the display section. FIGS. 20 and 21 are diagrams illustrating a viewfinder image where the zoom lens is set to the long focus side, and show an example of assist display (auxiliary displaying) in a state where the main object is lost from the display range of the display section. Of the drawings, FIG. 20 is a diagram showing the mode of an auxiliary arrow icon of a case where the main object is present at a relatively close position with respect to a region which may be displayed in the viewfinder image. FIG. 21 is a diagram showing the mode of an auxiliary arrow icon of a case where the main object is present far from a region which may be displayed in the viewfinder image.

In the present embodiment, coordinate information based on the photographing apparatus (camera) is acquired by computation, and is held as position information of a main object in the viewfinder image. That is, this coordinate information is information regarding the angle of inclination and the like from a reference state where the attitude (horizontal state) and the direction (azimuth) of the photographing apparatus (camera) are taken as the reference.

According to the camera 1 of the present embodiment, when a main object is set in the viewfinder image by a photographer, the position of the main object in the image is calculated by computation. Setting of the main object in this case is performed in the following manner, as in the first embodiment described above.

That is:

A main object desired to be photographed is captured in the viewfinder image (live view image on the display section 18) of the camera 1.

The attitude of the camera 1 is maintained in such a way that the main object is positioned near substantially at the center of the viewfinder image.

An operation, such as a focus operation, which is to be performed before the normal photographing operation is performed with the main object captured in the viewfinder image.

When the focus is on, detection of the face, the color, the pattern or the like of the main object is performed, and the main object is identified. At this time, moving object tracking control is automatically started for the main object.

When the main object is set in the above manner, a computation process of calculating the position of the main object in the image based on the angle of elevation, the azimuth or the like of an optical axis O of the camera 1 is then performed. The computation process for calculating the position of the main object in this case is mainly performed by the coordinate determination section 11$h$ or the like of the signal processing control section 11 of the camera 1, for example. The computation process of calculating the main object position is performed in the following manner.

Here, as the state where the camera 1 is turned toward a main object 101, the states shown in FIGS. 7 and 9 are illustrated. Also, the viewfinder images on the display section 18 when the camera 1 is in these states are as shown in FIGS. 8 and 10. The flow of the calculation process of the main object (target) position in the viewfinder image in such a state will be illustrated below.

First, a position Yt in the vertical direction (Y direction) of a main object 101 in a rectangular viewfinder image is obtained (see FIGS. 7 and 8). The reference signs shown in FIGS. 7 and 8 are as follows.

O: Optical axis of photographing optical system (lens 26)
H: Horizontal line
Gv: End of angle of view in vertical direction of screen (only the upper end is shown in FIG. 7)
Sv: Virtual line connecting photographing optical system (lens 26) and main object 101
Y: Width dimension (pixel) of viewfinder image in vertical direction
Yt: Separation distance (pixel) between optical axis and main object in vertical direction
θav: ½ the angle of view of photographing optical system (lens) 26 in vertical direction $$\theta av = 180/\pi \times 2a\tan(Y/2f)/2 [\text{deg.}],$$

where f is a focal length.
θbv: Angle between optical axis O and virtual line Sv indicating position of main object 101 (object angle)

$$\theta bv = \theta av \times (Yt/(Y/2))$$

θcv: Angle between horizontal line H and optical axis O. This θcv is acquired from a detection result of the acceleration/angular velocity sensor 17. Note that, if the distance to an object is about 10 cm, accelerometers, angular velocity sensors and the like these days are accurate to about 0.1 degrees, and the accuracy is enough to identify the position of an object about the size of a bird.

θdv: Angle between horizontal line and object position (vertical direction)

$$\theta dv = \theta bv + \theta cv$$

The position of the main object 101 in the viewfinder image in the vertical direction is calculated in the above manner.

Next, a position Xt in the horizontal direction (X direction) of the main object 101 in a rectangular viewfinder image is obtained (see FIGS. 9 and 10). The reference signs shown in FIGS. 9 and 10 are as follows. Note that description of the same reference signs as in FIGS. 7 and 8 is omitted. And, the azimuth angle expressed on a plane is generally expressed clockwise with north (N) being the reference (0 degree), east (E) being 90 degrees, south (S) as 180 degrees, and west (W) as 270 degrees. This conventional, general mode is applied in the present embodiment. That is:

N: Reference for azimuth angle (0 degree); indicates north (N)
E: 90 degrees clockwise from reference for azimuth angle; indicates east (E)
S: 180 degrees clockwise from reference for azimuth angle; indicates south (S)
W: 270 degrees clockwise from reference for azimuth angle; indicates west (W)
Gh: End of angle of view in horizontal direction of screen (only the left end is shown in FIG. 9)
Sh: Virtual line connecting photographing optical system (lens 26) and main object 101
X: Width dimension (pixel) of viewfinder image in horizontal direction
Xt: Separation distance (pixel) between optical axis and main object in horizontal direction
θah: ½ the angle of view of photographing optical system (lens) 26 in horizontal direction $$\theta ah = 180/\pi \times 2a \tan(X/2f)/2 [\text{deg.}],$$

where f is a focal length.
θbh: Angle between optical axis O and virtual line Sh indicating position of main object 101 (object angle)

$$\theta bh = \theta ah \times (Xt/(X/2))$$

θch: Angle between line N of azimuth angle of 0 degree and optical axis O. This θch is acquired from a detection result of the azimuth sensor 32.
θdh: Angle between line N of azimuth angle of 0 degree and object position (horizontal direction)

$$\theta dh = \theta bh + \theta ch$$

Next, the concept of a display mode of a viewfinder image that is displayed on the display section at the time of the photographing operation using the photographing apparatus (camera) of the present embodiment will be described with reference to FIGS. 16 to 19.

In the present embodiment, a small auxiliary screen is displayed in an overlapping manner on a partial region of the live view image (viewfinder image) on the display section 18 undergoing zooming. This small auxiliary screen is referred to as an assist screen. An image immediately before the start of zooming, that is, a still image that is created by the ideal image creation section 11i (see FIG. 1) when the setting is on the short focus (wide angle) side of the lens 26, is displayed on this assist screen, for example.

For example, FIG. 16 illustrates a display region 18a (viewfinder image) on the display section 18 where the zoom lens is set to the short focus side. In FIG. 16, the main object desired to be photographed is indicated by a reference sign 101, and in this case, a bird is taken as the target (main object). In this example, the main object 101 is moving in the viewfinder image. In the viewfinder image in FIG. 16, the main object 101 which has moved over a predetermined period of time is indicated by the reference sign 101x.

As shown in FIG. 17, according to the photographing apparatus (camera 1) of the present embodiment, when zooming to the long focus side is performed from the state shown in FIG. 16 (state of short focus side), an assist screen frame 60 is displayed in the display region 18a (viewfinder image) of the display section 18, at a predetermined region in the live view image. After the main object is set, an image 60a immediately before the zooming is displayed in the assist screen 60. This image 60a is a still image acquired in the state before zooming, that is, the state where the lens 26 is set to the short focus side. In the present embodiment, this image 60a is temporarily recorded in advance before zooming. Note that this image 60a is an image that is displayed in the assist screen frame 60 as described above, and is thus referred to as an assist screen background image.

Also, a frame display 61 is displayed near substantially at the center of the image 60a. This frame display 61 is an indicator frame indicating the angle of view corresponding to the currently set focal distance of the lens 26 with respect to the angle of view of the assist screen background image 60a. Accordingly, in the example shown in FIG. 17, the live view image that is currently being acquired in real-time is displayed (only a part of the main object is displayed) in the display region 18a of the display section 18, and also, the assist screen frame 60 is displayed. In this case, the assist screen background image 60a which is already temporarily recorded is displayed in the assist screen frame 60 using the entire region of the assist screen frame 60, and also, the frame display 61 corresponding to the focal length that is currently set is displayed, being superimposed on the assist screen background image 60a.

On the other hand, FIG. 18 is a diagram illustrating another state (assist display) of the viewfinder image where zoom is at the long focus side. In the example display of FIG. 18, the main object 101 is out of the display range of the display section 18. That is, the state shown in FIG. 18 shows a state where the direction of the camera 1 is deviated from the main object, and the main object is lost from the viewfinder image. When this state is reached, the assist screen background image 60a which is reduced so as to have an outer peripheral margin portion, and the frame display 61, corresponding to the current zoom setting (focal length), that is displayed at a predetermined region in the assist screen background image 60a are displayed in the assist screen frame 60, and also, an icon image 60b representing the main object is displayed in the outer peripheral margin portion of the assist screen background image 60a, at a position predicted by the moving object prediction section 11f. Note that the icon image 60b representing the main object is created based on photographed image data acquired by the image pickup device 13, at the time of setting of the main object, for example. Alternatively, an icon image corresponding to an object such as a face, an animal or a plant detected by the face detection section 31 based on the photographed image data acquired by the image pickup device 13 may be read from a collection of icon images prepared in advance in the recording section 14 or the like, and be used. The aim of displaying an icon image is to notify the photographer of the object present at the outer peripheral margin portion of the assist screen background image 60a. Accordingly, the display mode (sign, mark, indicator, figure, etc.) of the icon image is not particularly limited as long as this aim may be achieved.

According to the photographing apparatus (camera 1) of the present embodiment, assist display which enables grasping of a rough predicted position of the lost main object is performed by such an assist screen frame 60 being displayed as a part of the live view image (viewfinder image). Accordingly, the photographer is enabled to re-capture the main object in the live view image (viewfinder image) simply by correcting the direction of the camera 1 in such a way that the predicted position of the main object is included in the assist screen frame 60.

Note that FIG. 19 is a diagram illustrating another state of the viewfinder image where zoom is at the long focus side. This example shows a state where the main object is captured in the display region 18a of the display section 18.

FIGS. 20 and 21 are diagrams illustrating further other states (assist displays) of the viewfinder image where zoom is at the long focus side.

FIG. 20 is a diagram showing a state immediately after the main object 101 is lost from the display range of the viewfinder image. And, FIG. 21 shows a state following the state of FIG. 20, that is, a state where the main object 101 has moved farther away from the display range of the viewfinder image.

When this state is reached, the photographing apparatus (camera 1) of the present embodiment displays arrow icons 63a and 63b in the viewfinder image on the display section 18 as indicators for indicating the rough positions of the main object 101 outside the screen.

The example in FIG. 20 is a state where the main object 101 is moving out of the screen from near the top right corner of the screen. At this time, the arrow icon 63a for indicating the existence of the main object 101 is displayed at near where the main object 101 has made its exit, that is, at near the top right corner of the viewfinder image.

The example in FIG. 21 is a state where a period of time has passed since the state in FIG. 20, and the main object 101 is far away from the viewfinder image. At this time, the arrow icon 63b for indicating the existence of the main object 101 is displayed at substantially the same position as the arrow icon 63a described above. In this case, the arrow icon 63b in FIG. 21 is displayed in a smaller size than the arrow icon 63a in FIG. 20. This is an example where the degree of distance from the display range of the viewfinder image after the main object 101 has moved out of the screen is expressed by the change in the size of the arrow icon (63a, 63b). Accordingly, for example, in a state where the main object 101 is lost from the display range of the viewfinder image on the display section 18, if the size of the arrow icon is great, it can be understood that the main object 101 is close. Then, it is highly likely that the photographer is able to re-capture the main object 101 into the display range of the viewfinder image by re-directing the camera 1 in the direction indicated by the arrow icon. On the other hand, if the size of the arrow icon is small, it is indicated that the main object 101 is far off. In this case, it can be understood that the photographer has to turn the camera 1 greatly in the direction indicated by the arrow icon. Then, the main object 101 may possibly be re-captured into the display range of the viewfinder image.

In the examples shown in FIGS. 20 and 21, the size of the arrow icon (63a, 63b) is displayed to be smaller as the main object is further away. In this case, the change in the size of the arrow icon is set to change from large to small, and to be proportionate to the distance to the main object.

This example is not restrictive, and as another example, the arrow icon may be displayed to be larger as the main object moves further away. In this case, the size of the arrow icon is set to be proportionate to the amount of correction in the direction of the camera necessary to re-capture the main object. In any case, the photographer is enabled to perform intuitive operation by the arrow icon being displayed with its size changed according to the position information of the main object which has moved out of the screen.

Next, a process sequence of a photographing operation of the photographing apparatus (camera) of the present embodiment will be described with reference to the flowchart of FIG. 11. The camera 1 is assumed to be in an active state with the power being on.

In this state, in step S150, the signal processing control section 11 checks whether or not the operation mode that is currently set is the photographing mode. In the case it is confirmed here that the photographing mode is set, the process proceeds to the next step S151. In the case it is confirmed that other than the photographing mode is set, the process proceeds to step S181.

In step S181, the signal processing control section 11 checks whether or not the operation mode that is currently set is a reproduction mode. In the case it is confirmed here that the reproduction mode is set, the process proceeds to a predetermined reproduction process sequence. Note that the reproduction process sequence of the camera 1 of the present embodiment is a similar process sequence to that of a conventional, general photographing apparatus (camera), and detailed illustration and description thereof will be omitted. On the other hand, in the case it is confirmed that other than the reproduction mode is set, transition to other operation modes is possible, but since these other operation modes are not directly relevant to the present invention, detailed description and illustration thereof are omitted, and in the flowchart of FIG. 11, it is simply assumed that the process returns to step S150 mentioned above.

When it is confirmed in the process of step S150 that the photographing mode is set, and the process proceeds to step S151, the signal processing control section 11 controls, in step S151, the image pickup section and the like configured by the image pickup device 13, the lens 26 and the like, and starts an image pickup operation process. Note that, although details are not given, as the trigger for starting this image pickup operation process, there are a first-stage operation of a shutter release operation on an operation member for starting the image pickup operation, that is, a first (1st) release operation, and a touch operation on an arbitrary position on the touch panel 18b, for example. Thus, the image pickup operation process is actually started when a photographer performs such predetermined first release operations.

In step S152, the signal processing control section 11 starts an auto exposure (AE) control process.

Subsequently, in step S153, the signal processing control section 11 receives an output from the image pickup section and measures light, and performs a predetermined exposure computation process based on the light measurement result.

In step S154, the signal processing control section 11 checks whether or not the AE process is completed, that is, whether or not a stable exposure value is set. Here, processes the same as steps S150 to S154 described above are repeated until the AE process is completed, and in the case completion of the AE process is confirmed, the process proceeds to the next step S155.

In step S155, the signal processing control section 11 starts an autofocus (AF) control process. Note that as the trigger for starting the AF control process, there is a touch operation on the touch panel 18b, for example. That is, the AF processing control process is started when a photographer touches a position, on the touch panel 18b, corresponding to a desired object while viewing the live view image that is displayed on the display section 18.

Next, in step S156, the signal processing control section 11 receives an output from the image pickup section, and controls the focus control section 26b through the focus drive section 24b, in cooperation with the lens control section 21 through the communication sections 12 and 22, and performs a focus position control process.

Then, in step S157, the signal processing control section 11 performs predetermined image processing based on the output (acquired image data) from the image pickup section.

In step S158, the signal processing control section 11 performs a face detection process of detecting the face, the color, the pattern or the like of the object based on the output from the face detection section 31.

Subsequently, in step S159, the signal processing control section 11 performs an image movement amount calculation process of calculating a motion vector of the object between frames based on a plurality of pieces of image data that are sequentially acquired by the image pickup device 13. This image movement amount calculation process is performed by the moving object prediction section 11f, for example.

In step S160, the signal processing control section 11 controls the image pickup section, the display section 18 or the like, and performs a live view image display process. Then, the process proceeds to step S161.

In step S161, the signal processing control section 11 checks whether or not the operation mode that is currently set is a movie mode of shooting a movie, among the photographing modes. In the case it is confirmed that the movie mode is set, the process proceeds to step S162, and a predetermined movie recording process is performed in step S162. In the case the movie mode is not set, the process proceeds to step S200.

Note that each specific process of each of the processes of steps S151 to S160, and S162 is assumed to be a general process that is widely used by a conventional, general camera, and detailed description thereof is omitted.

Next, in step S200, the signal processing control section 11 performs a target selection process. FIG. 12 shows a flowchart of a target selection process subroutine. Note that the target here refers to the main object desired to be photographed.

When the target selection process sequence of FIG. 12 is performed, first, in step S201, the signal processing control section 11 checks whether or not a desired target (main object 101) is present in the viewfinder image, based on pieces of live view image data that are outputted from the image pickup device 13 and sequentially generated. Here, in the case a desired target (main object 101) is not present in the viewfinder image, the process proceeds to the next step S202. In the case it is confirmed that a desired target (main object 101) is present in the viewfinder image, the process proceeds to step S210.

In step S202, the signal processing control section 11 checks whether or not a touch operation is performed in the process of step S151 or S155 in FIG. 11, for example. In the case no touch operation is confirmed here, the process proceeds to the next step S203. In the case a predetermined touch operation is confirmed, the process proceeds to step S208.

Subsequently, in response to an instruction such as the touch operation which has been confirmed in step S202, the signal processing control section 11 determines, in step S208, the object that is at the position coordinates (touch position coordinates) where the touch operation has been performed as the target (main object) and selects the object as the target. Then, the process proceeds to step S210.

On the other hand, in step S203, the signal processing control section 11 checks whether or not a face (or a predetermined color, pattern, or the like) is detected in the viewfinder image, based on the result of the face detection process of step S158 in FIG. 11 described above. Here, in the case a face or the like is not detected in the viewfinder image, the process proceeds to the next step S204. In the case a face or the like is detected in the viewfinder image, the process proceeds to step S207.

In step S207, the signal processing control section 11 determines an image region including the face or the like in the viewfinder image which has been detected as a result of the face detection process as the target (main object), and selects the image region as the target. Then, the process proceeds to step S210.

On the other hand, in step S204, the signal processing control section 11 checks whether or not a moving object is present in the viewfinder image, based on the result of the image movement amount calculation process of step S159 in FIG. 11 described above. Here, in the case a moving object is not confirmed in the viewfinder image, the process proceeds to the next step S205. In the case a moving object is confirmed in the viewfinder image, the process proceeds to step S206.

In step S206, the signal processing control section 11 determines the image region including the moving object in the viewfinder image which has been confirmed as the target (main object), and selects the image region as the target. Then, the process proceeds to step S210.

On the other hand, in step S205, the signal processing control section 11 checks whether or not selection setting of an AF selection area is performed in the process of step S155 in FIG. 11 described above and the like. Here, in the case setting of an AF selection area is not confirmed, the series of processes is ended, and the process goes back (returns) to the original process sequence of FIG. 11. In the case setting of an AF selection area is confirmed, the process proceeds to step S209.

In step S209, the signal processing control section 11 determines that the image region including the AF selection area set in the viewfinder image as the target (main object), and selects the image region as the target. Then, the process proceeds to step S210.

In step S210, the signal processing control section 11 performs a process of extracting information about the image including the target (main object) selected and set in each of steps S206 to S209 described above. This information extraction process is performed by the image processing section 11b, for example.

Subsequently, in step S211, the signal processing control section 11 performs a target image icon generation process of iconizing the target image extracted in the process of step S210 described above. Then, the series of processes is ended, and the process goes back (returns) to the original process sequence of FIG. 11. Then, after going back to FIG. 11, the process proceeds to the next step S300.

Note that as a case where selection of a target fails in any of respective processes of steps S201 to S205 described above, and the process goes back (returns) to the process sequence of FIG. 11, a state where the main object is not captured due to the camera shake being great or the amount of movement of the object in the viewfinder image being great may be assumed, for example. Accordingly, in such a case, the process of the next step S300 and later may not be continued, and the process sequence may be such that the process goes back to step S100 described above.

Next, in step S300, the signal processing control section 11 performs a target coordinate calculation/prediction process.

FIG. 13 is a flowchart of a target coordinate calculation/prediction process subroutine.

When a target coordinate calculation/prediction process sequence of FIG. 13 is performed, first, in step S301, the signal processing control section 11 checks whether or not a target (main object) is present in the live view image. Here, in the case existence of a target (main object) is confirmed, the process proceeds to step S304. In the case a target (main object) does not exist, the process proceeds to step S302.

In step S302, the signal processing control section 11 checks whether or not there are a plurality of pieces of target (main object) position information. Here, in the case there are a plurality of pieces of target (main object) position information, the process proceeds to step S303. In the case a plurality of pieces of target (main object) position information do not exist, the series of processes is ended, and the process goes back (returns) to the original process sequence of FIG. 11.

In step S303, the signal processing control section 11 performs a process of calculating target position prediction information. Then, the series of processes is ended, and the process goes back (returns) to the original process sequence of FIG. 11.

On the other hand, if existence of a target (main object) is confirmed in the process of step S301 described above, and the process proceeds to step S304, the signal processing control section 11 acquires information from the azimuth sensor 32 in step S304. The information that is acquired at this time is temporarily recorded in the temporary recording section 16 as data.

Next, in step S305, the signal processing control section 11 acquires information from the acceleration/angular velocity sensor 17. The information that is acquired at this time is temporarily recorded in the temporary recording section 16 as data.

Then, in step S306, the signal processing control section 11 acquires focal length information from the lens barrel 20 side in cooperation with the lens control section 21 through the communication sections 12 and 22. The information that is acquired at this time is temporarily recorded in the temporary recording section 16 as data.

Next, in step S307, the signal processing control section 11 performs a process of calculating target position information. This target position information calculation process uses the calculation process which has been described with reference to FIGS. 7 to 10 described above, for example.

Subsequently, in step S308, the signal processing control section 11 performs a process of temporarily recording/holding the target position information which has been calculated by the process of step S307 described above in the temporary recording section 16 as data, for example. Then, the series of processes is ended, and the process goes back (returns) to the original process sequence of FIG. 11. Then, after going back to FIG. 11, the process proceeds to the next step S400.

Next, in step S400, the signal processing control section 11 performs a save process of a still image for an assist screen background. FIG. 14 shows a flowchart of the save process of a still image for an assist screen background.

When the save process sequence for a still image for an assist screen background of FIG. 14 is performed, first, in step S401, the signal processing control section 11 checks whether or not there is an assist screen background image. Here, in the case there is no assist screen background image, the process proceeds to step S402. In the case there is an assist screen background image, the process proceeds to step S403.

In step S402, the signal processing control section 11 performs a process of temporarily saving the assist screen background image which has been confirmed in the temporary recording section 16 as a still image. Then, the series of processes is ended, and the process goes back (returns) to the original process sequence of FIG. 11.

On the other hand, in step S403, the signal processing control section 11 performs a process of comparing a former background image focal length and the current focal length. Here, in the case "former background image focal length>current focal length" is established, the process proceeds to step S402. In the case "former background image focal length≤current focal length" is established, that is, in the case of zooming from the long focus side to the short focus side, the series of processes is ended, and the process goes back (returns) to the original process sequence of FIG. 11. Then, after going back to FIG. 11, the process proceeds to the next step S500.

Next, in step S500, the signal processing control section 11 performs an assist display process. FIG. 15 shows a flowchart of the assist display process.

When an assist display process sequence of FIG. 15 is performed, first, in step S501, the signal processing control section 11 checks whether or not the main object (target) is lost, based on pieces of image data sequentially outputted from the image pickup section. Here, in the case a target lost state is not confirmed, the process goes back (returns) to the original process sequence of FIG. 11. Then, after going back to FIG. 11, the process proceeds to the next step S163. In the case the target lost state is confirmed, the process proceeds to step S502.

In step S502, the signal processing control section 11 checks whether or not a zoom operation is currently performed. Here, in the case it is confirmed that a zoom operation is being performed, the process proceeds to step S506. In the case it is confirmed that a zoom operation is not being performed, the process proceeds to step S503.

In step S503, the signal processing control section 11 controls the display section 18 or the like through the display control section 11e to display an assist screen at a predetermined region in a live view image that is currently displayed, and causes a still image for an assist screen background to be displayed in the assist screen (see the reference sign 60 in FIG. 17).

Next, in step S504, the signal processing control section 11 displays a target image icon at the current predicted position (see the reference sign 60a in FIG. 17 and the reference sign 60b in FIG. 18).

Subsequently, in step S505, the signal processing control section 11 performs frame display with respect to the direction which the camera is currently facing (see the reference sign 61 in FIGS. 17 to 19). Then, the process goes back (returns) to the original process sequence of FIG. 11. Then, after going back to FIG. 11, the process proceeds to the next step S163.

In the case the process proceeds to step S506 when the zoom operation is being performed in step S502 described above, the signal processing control section 11 calculates, in this step S506, the size of the arrow icon for assistance. Computation for this size calculation process is performed based on the output result of the moving object prediction section 11f or the like.

Subsequently, in step S507, the signal processing control section 11 performs control of displaying the arrow icon for assistance. Then, the process goes back (returns) to the original process sequence of FIG. 11. Then, after going back to FIG. 11, the process proceeds to the next step S163.

Returning to FIG. 11, in step S163, the signal processing control section 11 monitors an instruction signal from the operation section 15, and checks whether or not a second (2nd) release operation is performed. Here, in the case it is confirmed that the second release operation is performed, the process proceeds to the next step S164. In the case execution of the second release operation is not confirmed for a predetermined period of time, for example, the process goes back to step S150.

In the case execution of the second release operation is confirmed, and the process proceeds to step S163, the signal processing control section 11 performs in step S163 a still image photographing operation process. Still image data at the time of execution of the second release operation is thus acquired and is recorded in the recording section 14 as image data of a predetermined format, and then, the process goes back to step S150.

As described above, according to the second embodiment, when a main object 101 that is desired to be photographed is set in the viewfinder image (live view image on the display section 18) at the photographing apparatus (camera 1) having a high power zoom function, the camera 1 calculates the position information of the main object 101, which has been set, in the viewfinder image by computation, and also, performs moving object prediction. When a telephoto-side zoom operation is performed, the assist screen frame 60 is displayed at a predetermined region in the live view image, and a still image for an assist screen background acquired in advance is displayed in the assist screen frame 60, and a target icon representing the main object is displayed on the still image for an assist screen background.

According to this configuration, the photographer may easily keep capturing the main object 101 in the viewfinder image by correcting the direction of the camera 1 in such a way that the main object 101 is positioned at substantially the center of the viewfinder image by using display in the assist screen frame 60 as a guide.

Also, in the case the main object 101 moves out of the viewfinder image and is completely lost, an arrow icon for assistance (reference signs 63a and 63b in FIGS. 20 and 21) is displayed, and thus, the rough position of the main object which is supposed to be at a position out of the viewfinder image may be grasped, and the photographer may easily re-capture the main object 101 into the viewfinder image by using the rough position as the guide.

Note that in each of the embodiments described above, description is given on enlargement of an object at a great distance by zooming, but a similar issue may arise in the case of a target at a short distance with respect to a microscope or the like. For example, such auxiliary displaying is very effective for a user in the case of a microscope whose zoom factor may be changed (zooming is allowed) or at the time of changing an objective lens.

Also, the present invention is not limited to the embodiments described above, and various modifications and applications may of course be realized within the scope of the invention. Furthermore, the embodiments described above include inventions at various stages, and various inventions may be extracted by appropriately combining a plurality of disclosed structural components. For example, in the case where, even if some of the structural components are omitted from all the structural components indicated in each of the embodiments described above, the issues to be solved by the invention may be solved, and the effects of the invention may be achieved, the configuration from which the structural components are omitted may be extracted as the invention. This invention is not restricted by any specific aspects other than the appended claims.

Even if the operational flow is described in the scope of claims, specification, and drawings by using such terms as 'first' and 'next' for convenience, it does not mean that the operation needs to be performed in the stated order. Also, it is needless to say the each step constituting the operational flows may be omitted as appropriate if the step does not affect the essence of the invention.

Moreover, of the techniques described herein, the control and the functions described mainly with reference to the flowcharts may be, in many cases, set by programs, and the control and the functions described above may be realized by a computer reading and executing the programs. The programs may be entirely or partially recorded or stored in a portable medium such as a non-volatile memory, such as a flexible disk or a CD-ROM, a hard disk, or a storage medium such as a volatile memory as a computer program product, and may be distributed or provided at the time of shipping or via a portable medium or a communication line. A user may easily realize the photographing apparatus of the present embodiments by downloading the programs via a communication network and installing the programs in a computer, or by installing the programs in a computer from a recording medium.

The present invention is not limited to the photographing apparatus, which is a specialized electronic apparatus for photographing such as a digital camera, but may be widely applied to electronic apparatuses of other modes including a high power zoom function (regardless of being optical zoom or electronic zoom) and a photographing function, such as various types of electronic apparatuses with a photographing function including a mobile phone, a smartphone, an audio recording apparatus, an electronic diary, a personal computer, a tablet terminal device, a game machine, a portable TV, a clock, a navigation device using GPS (global positioning system), and the like.

Furthermore, application to an electronic apparatus including a function of acquiring an image by using an image pickup device and of displaying the acquired image on a display device, such as an apparatus for observation such as a telescope, a binocular or a microscope, is also possible.

What is claimed is:
1. A photographing apparatus comprising:
  an image pickup section configured by a photographing optical system for aiming at a target, and an image pickup device;
  a display section for receiving an image signal outputted from the image pickup section, and for displaying an image;
  a display control section for controlling display on the display section;
  a main object setting section for setting the target based on the image signal outputted from the image pickup section;
  a zoom control section for performing zooming with respect to the target;
  an ideal image creation section for creating a plurality of pieces of ideal image data that represent ideal images in each of which a main object is positioned substantially at a center of a field of view of a viewfinder and which correspond to arbitrary timings during continuous change in an angle of view due to zooming, based on image data acquired in a focus region on a short focus side before execution of zooming by the zoom control section; and
  an image comparison section for comparing the ideal images created by the ideal image creation section and output images based on pieces of image data sequentially outputted from the image pickup section, wherein the display control performs auxiliary displaying for clearly indicating a position of the target set by the main object setting section, such that the auxiliary displaying is superimposed on the image displayed on the display section, the image comparison section identifies a difference region between the ideal image and an output image based on a result of an image comparison process, and the display control section displays the difference region as the auxiliary displaying in a manner allowing viewing.

2. The photographing apparatus according to claim 1, wherein the auxiliary displaying is performed during zooming by the zoom control section.

3. The photographing apparatus according to claim 1, wherein when the difference region identified by the image comparison section covers an entire region of an image, an image based on the ideal image data created by the ideal image creation section is displayed as the auxiliary displaying.

4. The photographing apparatus according to claim 1, wherein the zoom control section drives the photographing optical system to cause the photographing optical system to perform zoom control.

5. The photographing apparatus according to claim 1, wherein the zoom control section controls an image processing section to cause the image processing section to perform electronic zoom control.

6. The photographing apparatus according to claim 1, wherein the main object setting section is an object detection section and is a face detection section.

7. The photographing apparatus according to claim 1, wherein the main object setting section is a moving object prediction section for calculating a motion vector between frames of pieces image data sequentially outputted from the image pickup section and for detecting a moving object.

8. The photographing apparatus according to claim 1, wherein an attitude determination section is a camera shake determination section, and the camera shake determination section determines an attitude of the apparatus based on a detection result of an accelerometer or an angular velocity sensor.

9. The photographing apparatus according to claim 1, further comprising:

a coordinate determination section for determining a position of a main object in an image based on image data outputted from the image pickup section, wherein the coordinate determination section determines the position of the main object based on a detection result of an accelerometer, an angular velocity sensor or an azimuth sensor.

10. The photographing apparatus according to claim 1, wherein an image based on the ideal image data created by the ideal image creation section is displayed, as the auxiliary displaying, in a partial region of the image displayed on the display section.

11. The photographing apparatus according to claim 7, wherein an icon indicating a main object is displayed, being superimposed on an image by the auxiliary displaying that is displayed in a partial region of the image displayed on the display section, at a predicted position of the moving object detected by the moving object prediction section.

12. An image display apparatus capable of changing an observation angle of view and acquiring an image, the image display apparatus comprising:

an ideal image creation section for creating a plurality of pieces of ideal image data that represent ideal images in each of which a main object is positioned substantially at a center of a field of view of a viewfinder and which correspond to arbitrary timings during continuous change in an angle of view due to an angle-of-view change operation;

an image comparison section for sequentially comparing the ideal images and images acquired based on the angle-of-view change operation; and a display control section for displaying a difference region between the ideal image and the image acquired based on the angle-of-view change operation as an auxiliary displaying in a manner allowing viewing, according to a result of identification of the difference region by the image comparison section based on a result of an image comparison process.

13. A display control method of an image display apparatus capable of changing an observation angle of view and acquiring an image, the display control method comprising:

creating a plurality of pieces of ideal image data that represent ideal images in each of which a main object is positioned substantially at a center of a field of view of a viewfinder and which correspond to arbitrary timings during continuous change in an angle of view due to an angle-of-view change operation;

sequentially comparing ideal images and images acquired based on the angle-of-view change operation; and identifying a difference region between the ideal image and the image acquired based on the angle-of-view change operation, based on a result of an image comparison process, and displaying the difference region in a manner allowing viewing.

14. A photographing method comprising:

a display step of receiving an image signal and displaying an image, the image signal being outputted from an image pickup section that comprises a photographing optical system for aiming at a target and an image pickup device;

a display control step of controlling display of the image in the display step;

a main object setting step of setting the target based on the image signal outputted from the image pickup section;

a zoom control step of performing zooming with respect to the target;

an ideal image creation step of creating a plurality of pieces of ideal image data that represent ideal images in each of which a main object is positioned substantially at a center of a field of view of a viewfinder and which correspond to arbitrary timings during continuous change in an angle of view due to zooming, based on image data acquired in a focus region of the photographing optical system on a short focus side before execution of zooming in the zoom control step; and an image comparison step of comparing the ideal images created in the ideal image creation step and the output images based on pieces of image data sequentially outputted from the image pickup section, wherein, in the display control step, auxiliary displaying for clearly indicating a position of the target set in the main object setting step is performed such that the auxiliary displaying is superimposed on the image displayed in the display step, in the image comparison step, a difference region between the ideal image and the output image is identified based on a result of an image comparison process, and in the display control step, the difference region is displayed as the auxiliary displaying in a manner allowing viewing.

\* \* \* \* \*